(12) United States Patent
Kawashima

(10) Patent No.: US 11,273,796 B2
(45) Date of Patent: Mar. 15, 2022

(54) WINDSHIELD WIPER BLADE

(71) Applicant: Pylon Manufacturing Corporation, Deerfield Beach, FL (US)

(72) Inventor: Hiroshi Kawashima, Sunrise, FL (US)

(*) Notice: Subject to any disclaimer, the term of this patent is extended or adjusted under 35 U.S.C. 154(b) by 0 days.

(21) Appl. No.: 16/933,937

(22) Filed: Jul. 20, 2020

(65) Prior Publication Data

US 2020/0361420 A1 Nov. 19, 2020

Related U.S. Application Data

(62) Division of application No. 15/600,180, filed on May 19, 2017, now Pat. No. 10,717,414.

(60) Provisional application No. 62/338,821, filed on May 19, 2016, provisional application No. 62/351,035, filed on Jun. 16, 2016.

(51) Int. Cl.
*B60S 1/38* (2006.01)
*B60S 1/40* (2006.01)

(52) U.S. Cl.
CPC ............... *B60S 1/381* (2013.01); *B60S 1/387* (2013.01); *B60S 1/3851* (2013.01); *B60S 1/3858* (2013.01); *B60S 1/3874* (2013.01); *B60S 1/3879* (2013.01); *B60S 1/3881* (2013.01); *B60S 1/3882* (2013.01); *B60S 1/4038* (2013.01); *B60S 1/4048* (2013.01); *B60S 1/38* (2013.01); *B60S 1/3889* (2013.01); *B60S 2001/3812* (2013.01); *B60S 2001/3817* (2013.01); *B60S 2001/3818* (2013.01); *B60S 2001/3836* (2013.01); *B60S 2001/3843* (2013.01); *B60S 2001/4032* (2013.01);
(Continued)

(58) Field of Classification Search
CPC .... B60S 1/40; B60S 1/38; B60S 1/381; B60S 1/3851; B60S 1/3882; B60S 1/3806; B60S 1/3848; B60S 1/3849; B60S 1/3879; B60S 1/3874; B60S 2001/3812; B60S 2001/3818; B60S 2001/3817; B60S 2001/3843
USPC ........................ 15/250.361, 250.43, 250.201
See application file for complete search history.

(56) References Cited

U.S. PATENT DOCUMENTS 7,540,061 B1 * 6/2009 Huang .................. B60S 1/3881
 15/250.201
7,543,353 B2 * 6/2009 Ko ........................ B60S 1/3858
 15/250.201
(Continued)

FOREIGN PATENT DOCUMENTS

DE 102011001874 A1 10/2011
DE 102012209304 A1 12/2013
(Continued)

OTHER PUBLICATIONS

European Search Report for Application No. EP800288 dated Dec. 2, 2019.

*Primary Examiner* — Gary K. Graham
(74) *Attorney, Agent, or Firm* — Javier Sobrado; Robert A. Weaver; The Brickell IP Group, PLLC

(57) ABSTRACT

A wiper blade having a wiper strip having a wide portion and a lip, and an elongate backing element. The backing element having a top portion, and two opposing legs that descend from the top portion, such that each opposing leg has a claw which extends towards the other opposing leg. A gap formed between the claws that is narrower than a width of the wide portion of the wiper strip. The claws, legs, and top portion define a wiper strip cavity sized to receive the wide portion wiper strip.

9 Claims, 22 Drawing Sheets

(52) U.S. Cl.
CPC ............... *B60S 2001/4054* (2013.01); *B60S 2001/4058* (2013.01)

(56) References Cited

U.S. PATENT DOCUMENTS

| | | |
|---|---|---|
| 2008/0052865 A1 | 3/2008 | Chiang |
| 2008/0222832 A1 | 9/2008 | Huang |
| 2012/0090123 A1* | 4/2012 | Caillot ............... B60S 1/381 15/250.04 |

FOREIGN PATENT DOCUMENTS

| | | |
|---|---|---|
| DE | 102012210390 A1 | 12/2013 |
| EP | 2599671 A2 | 6/2013 |

* cited by examiner

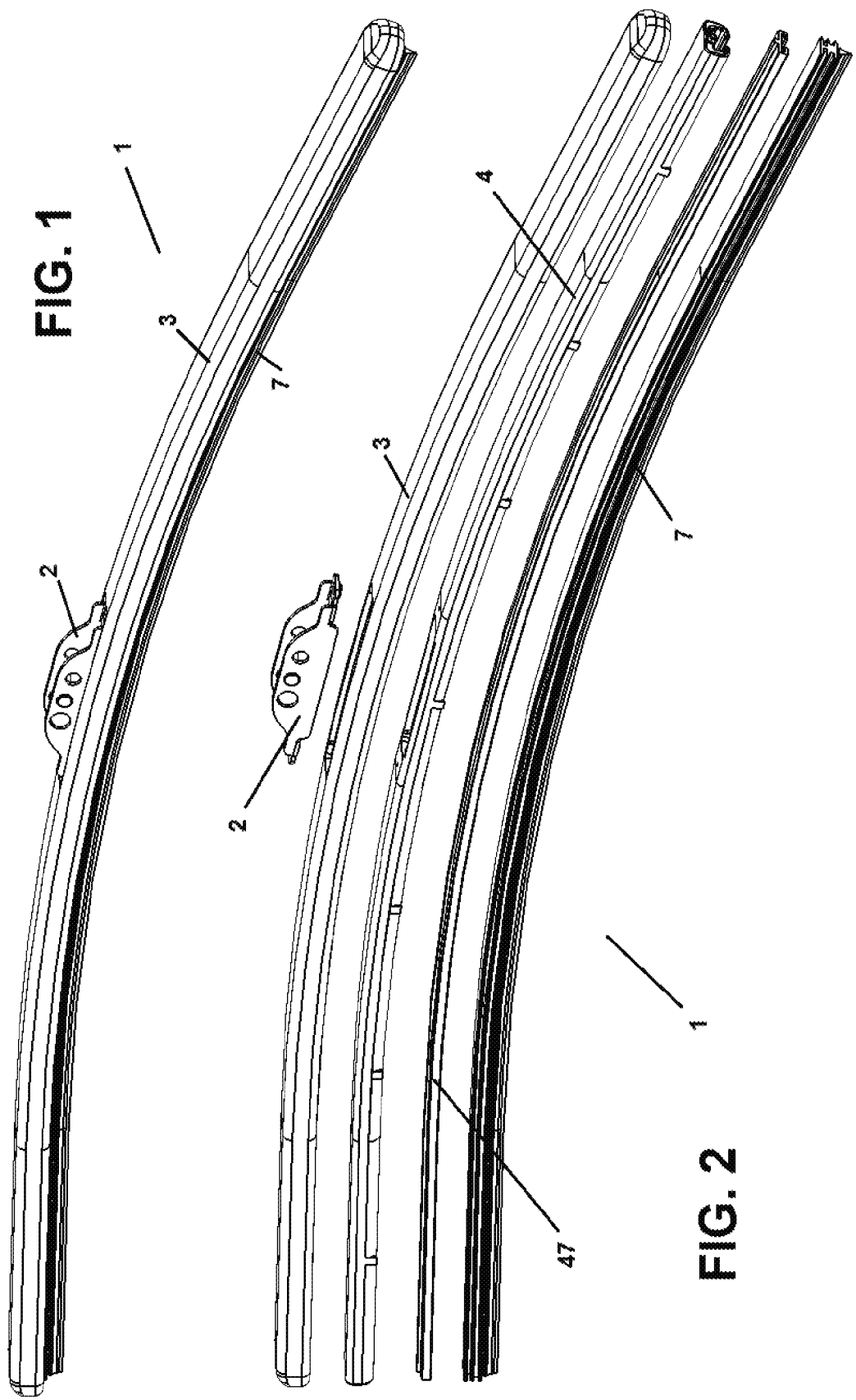

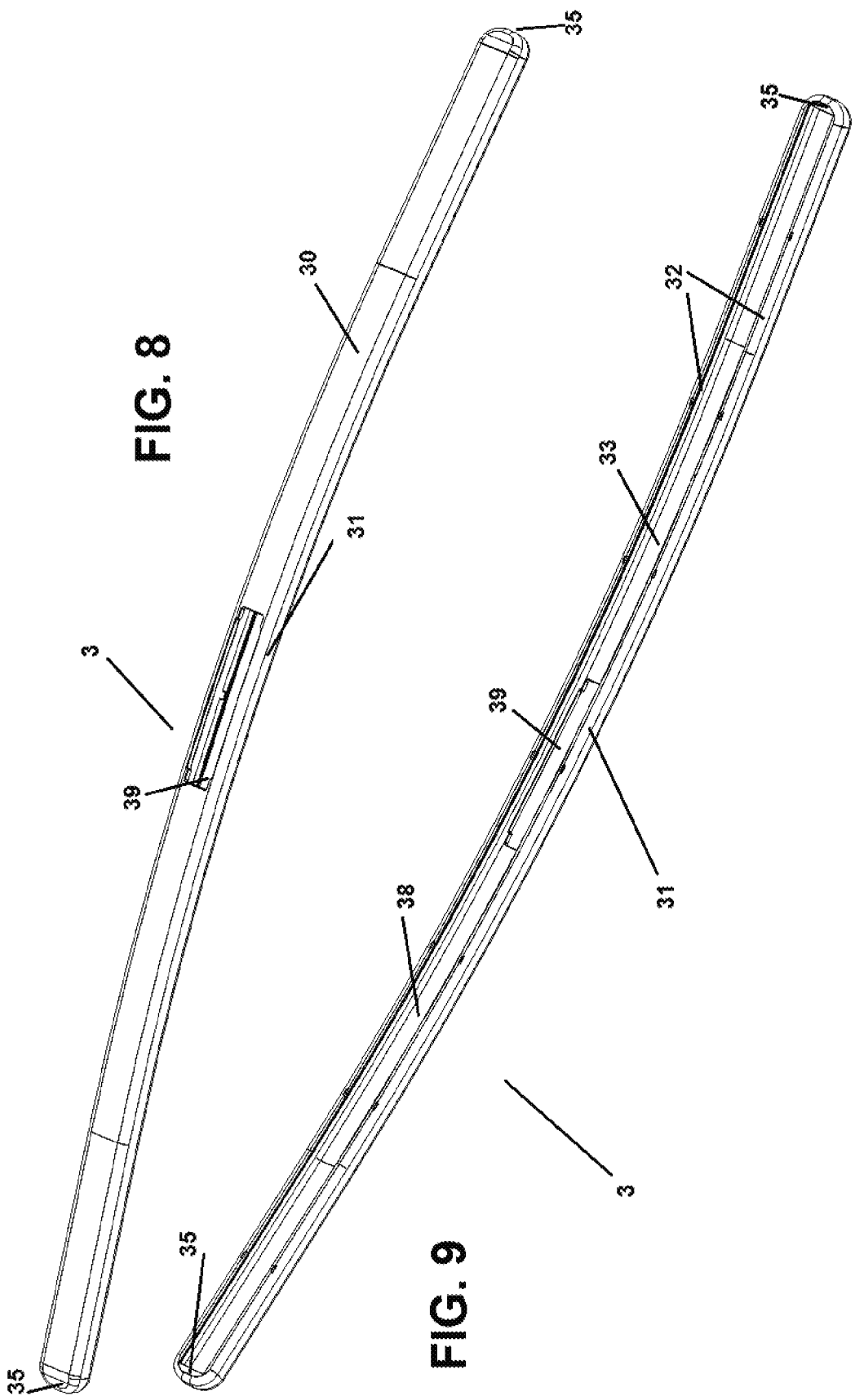

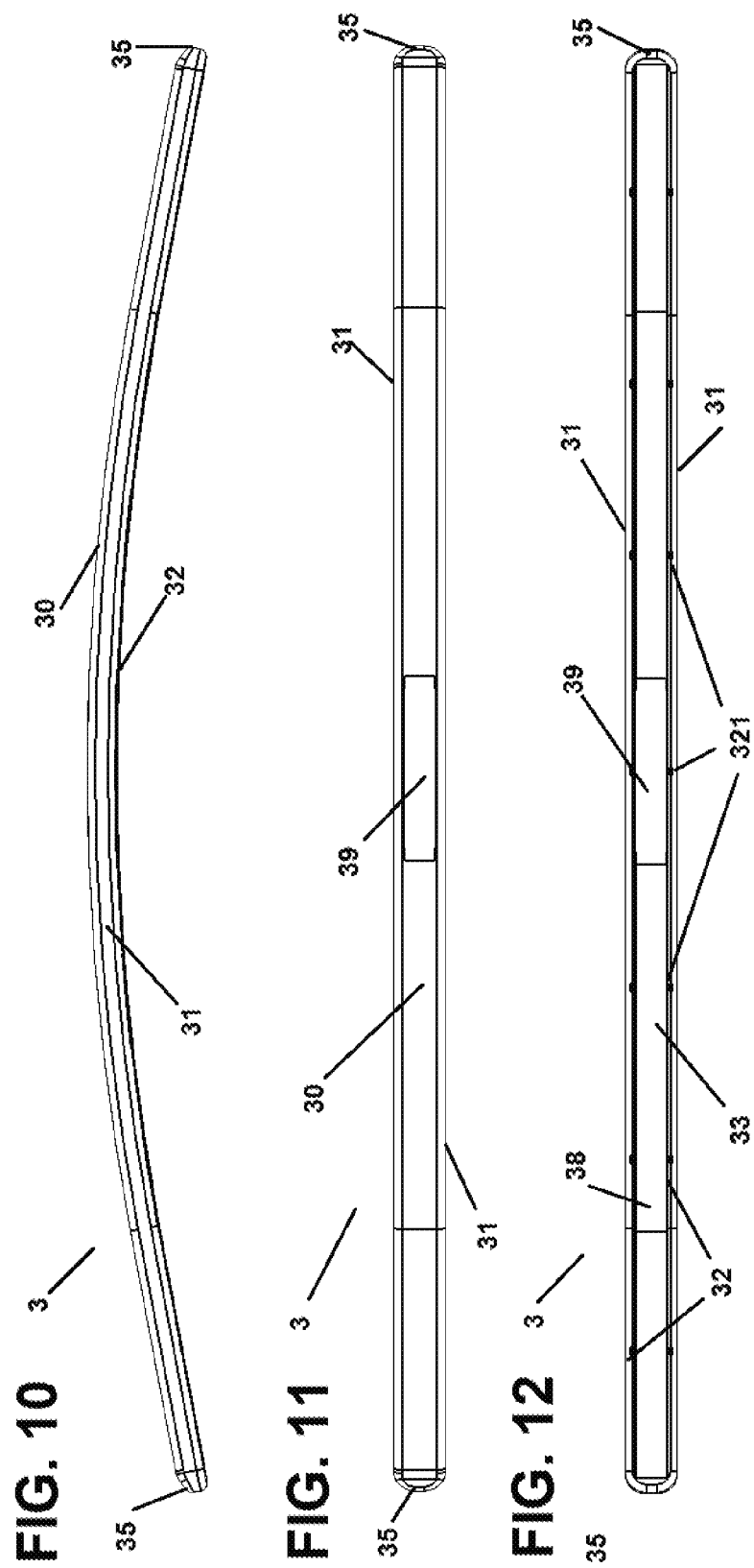

FIG. 13
FIG. 14
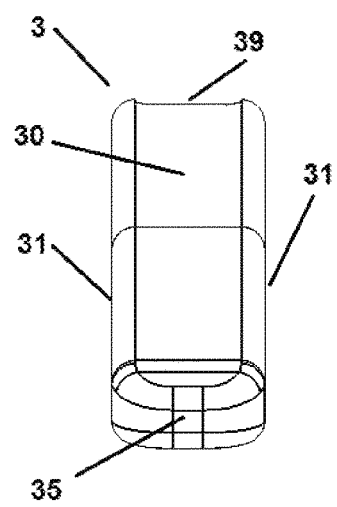
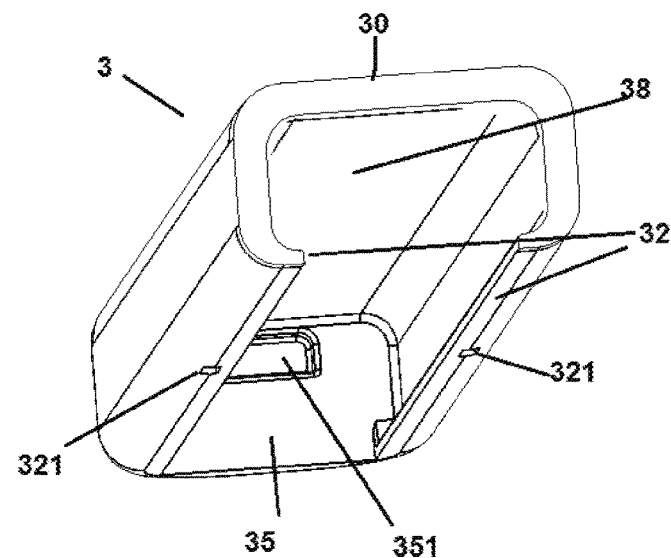
FIG. 15
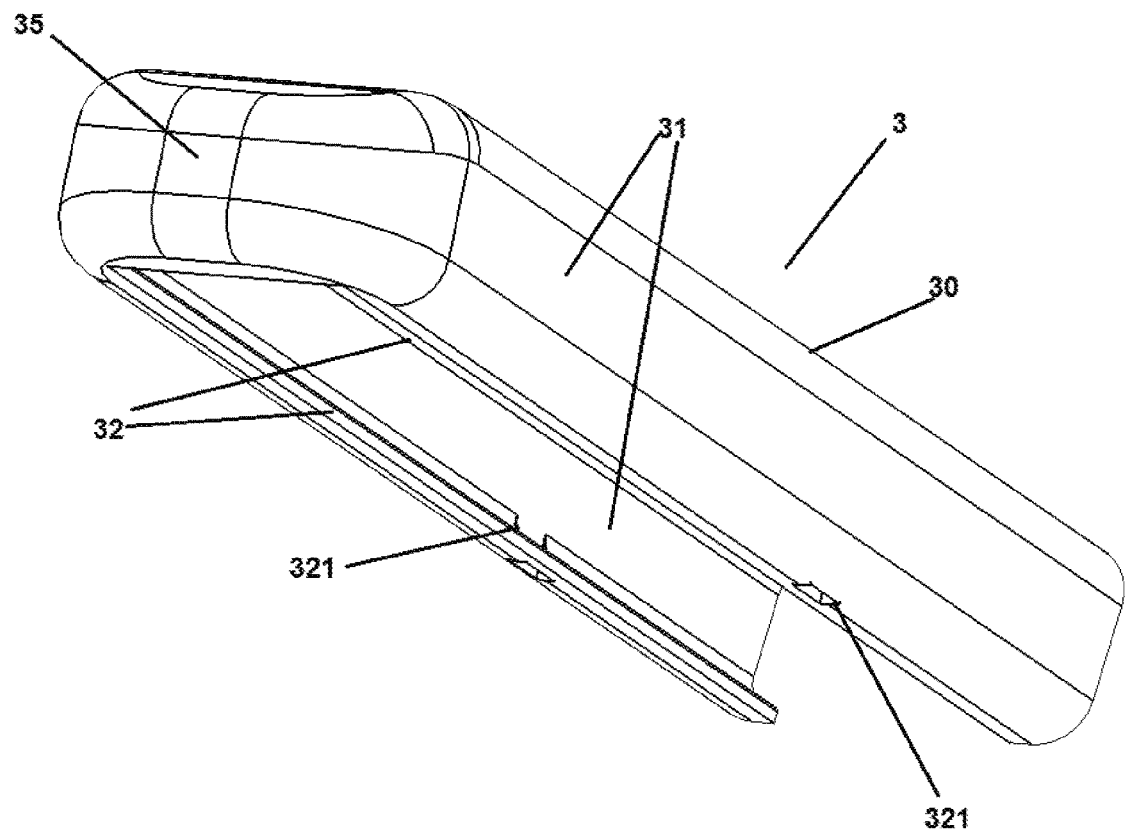

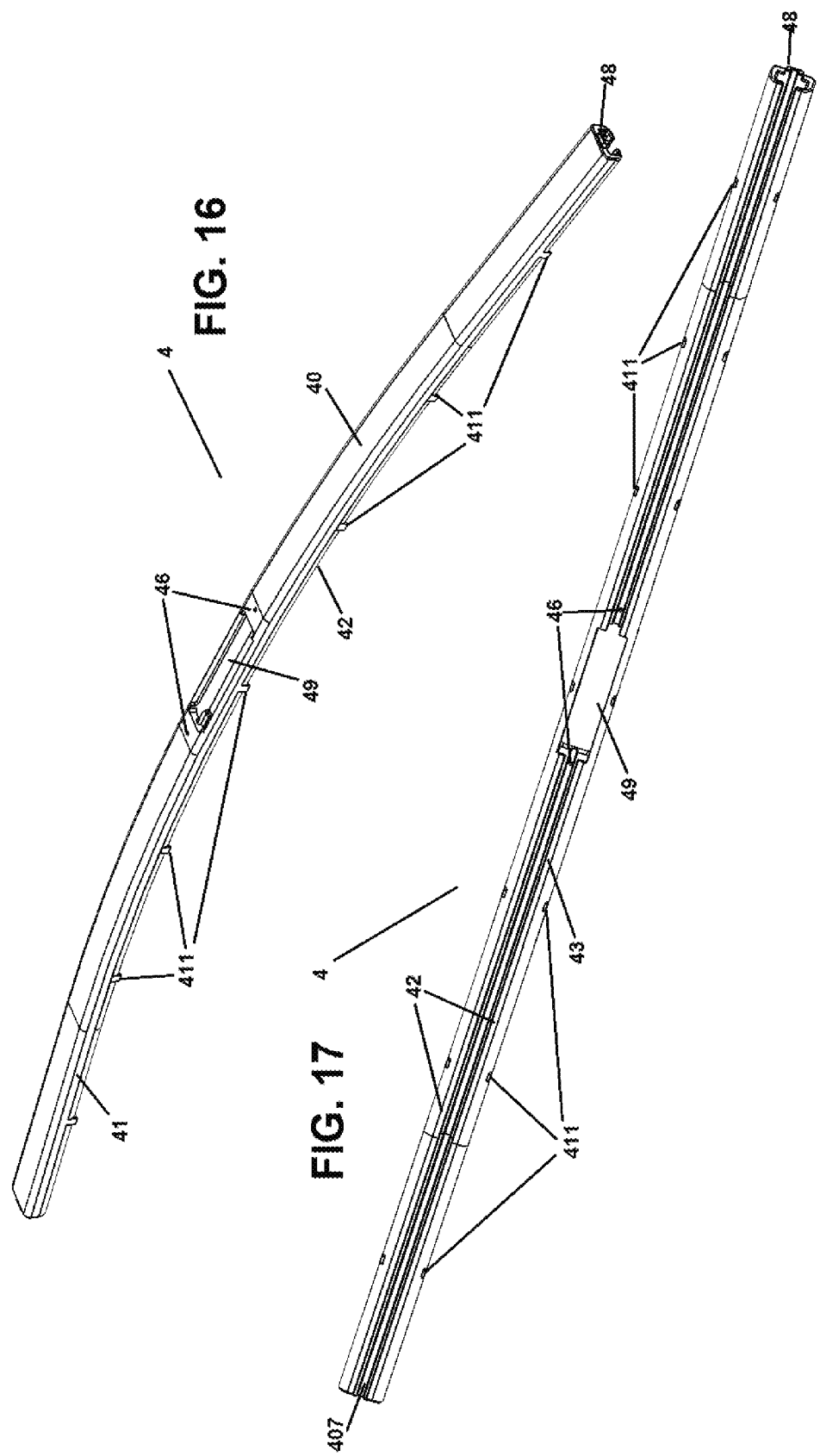

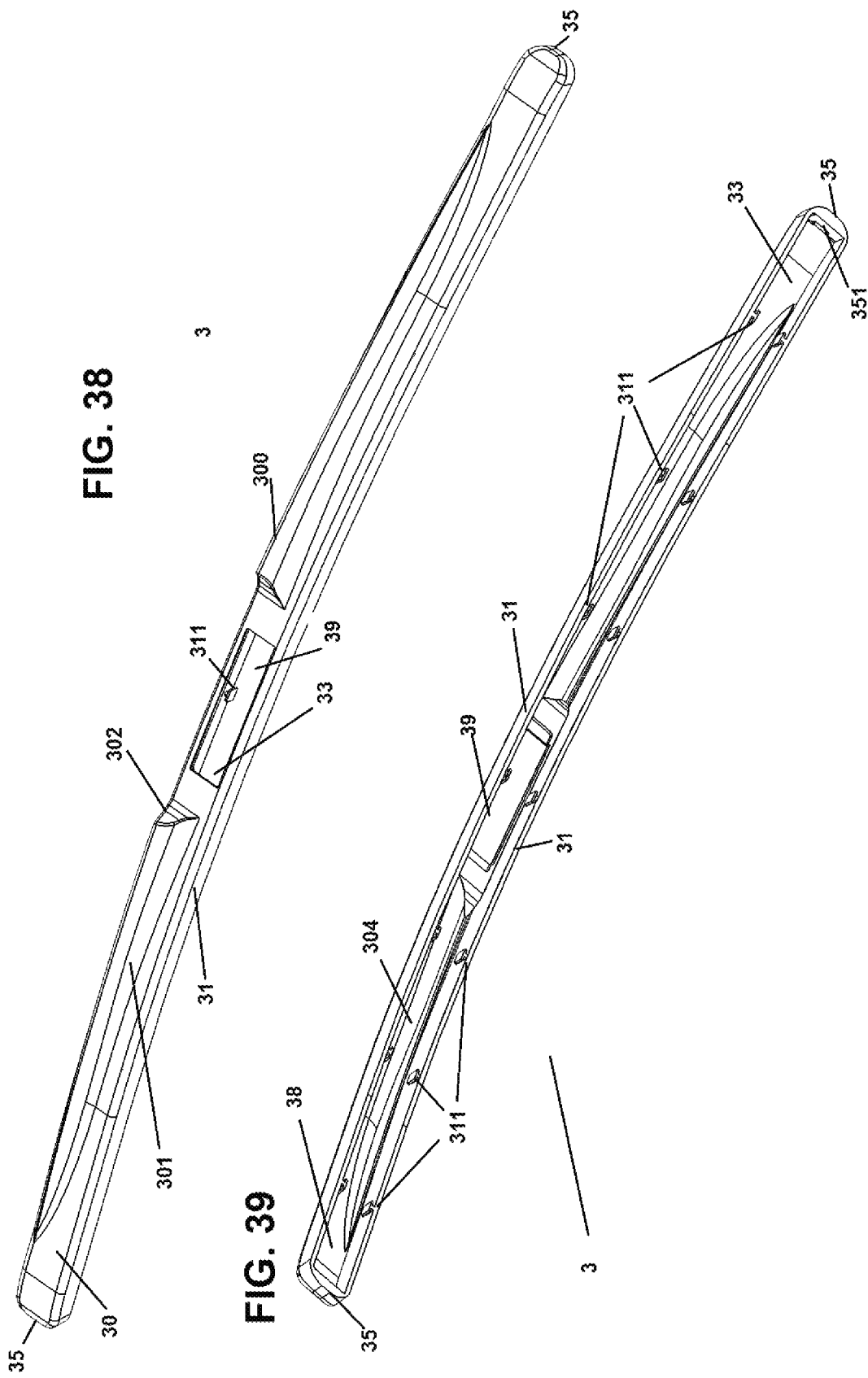

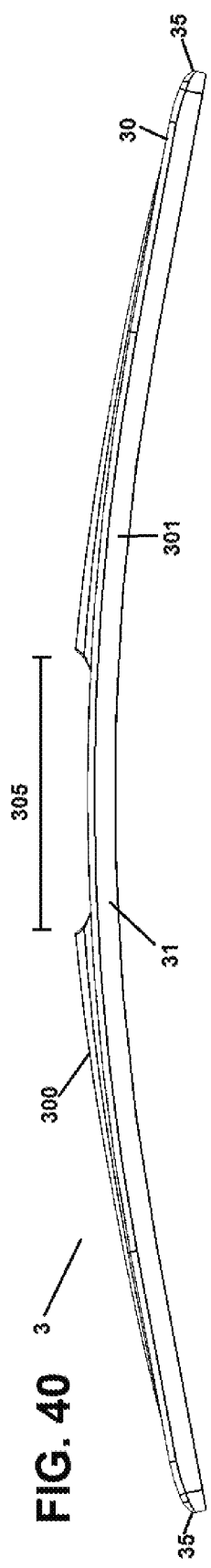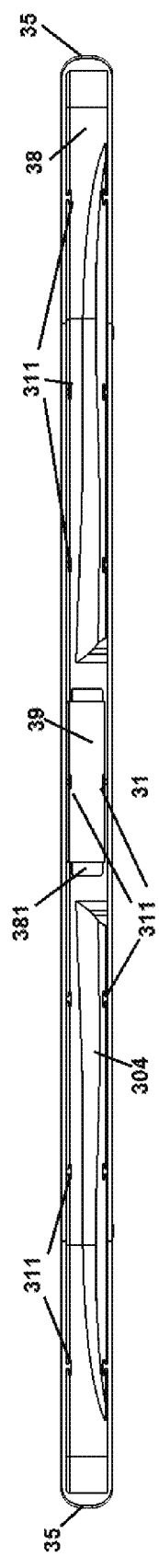

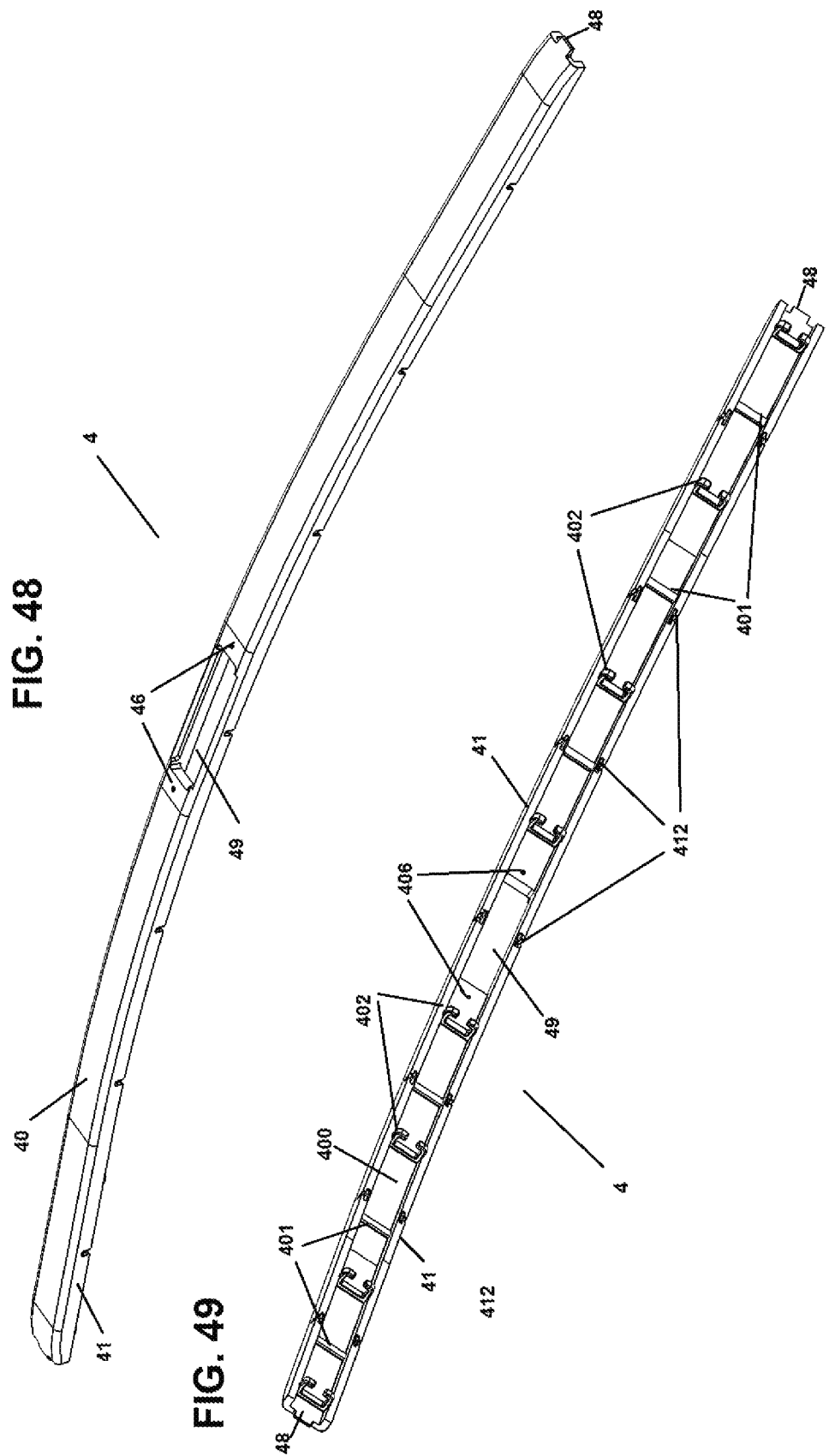

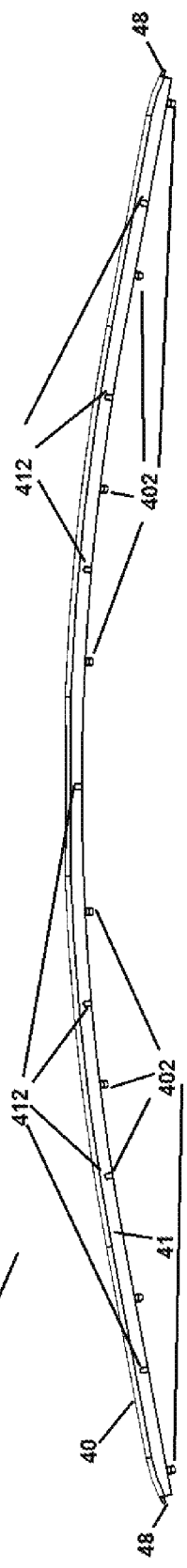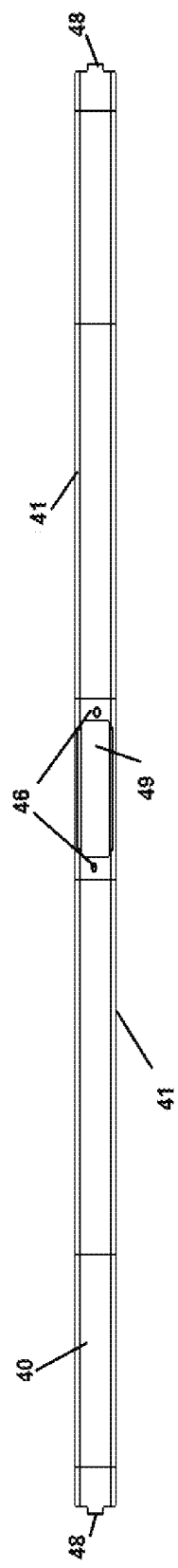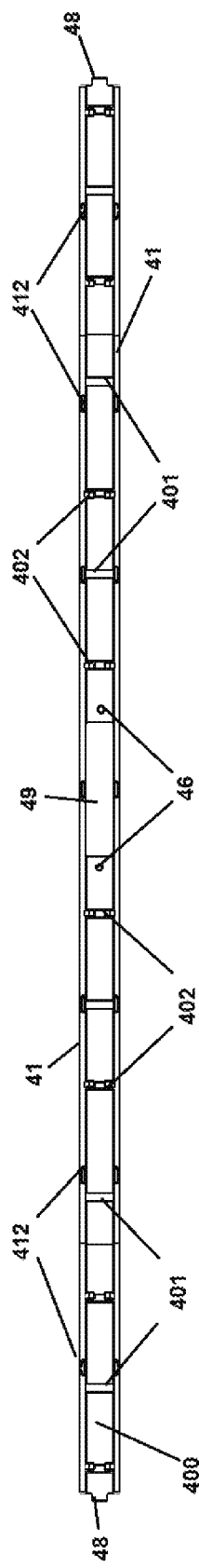

WINDSHIELD WIPER BLADE

CROSS REFERENCE TO RELATED APPLICATIONS

This application is a divisional of U.S. application Ser. No. 15/600,180 filed May 19, 2017, which claims the benefit of U.S. Provisional Application No. 62/338,821 filed May 19, 2016 and U.S. Provisional Application No. 62/351,035 filed Jun. 16, 2016, the disclosures of which are hereby incorporated herein by reference in their entirety.

TECHNICAL FIELD

Aspects of the disclosure relate in general to windshield wipers, and more particularly, to a wiper blade including a backing element, a wiper strip, a mounting base and a cover.

BACKGROUND

There are a variety of different types of wiper blades currently used on vehicles. "Traditional" or "conventional" wiper blades have a series of brackets (also called yokes or frames) arranged in tournament-style, which distribute the force from the wiper arm down to the wiper strip. "Beam" wiper blades, or beam blades, use a spring-elastic metal beam (also called a support element) to distribute the force from the wiper arm to the wiper strip. "Hybrid" wiper blades use both a beam and brackets to distribute the force from the wiper arm to the wiper strip.

The disclosed concepts offer a new solution, using a backing element in place of a beam or traditional frames.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a wiper blade may include a wiper strip having a wide portion and a lip, and an elongate backing element. The backing element may have a top portion, and two opposing legs that descend from the top portion, such that each opposing leg has a claw which extends towards the other opposing leg. A gap may be formed between the claws that is narrower than a width of the wide portion of the wiper strip. The claws, legs, and top portion define a wiper strip cavity sized to receive the wide portion wiper strip.

In certain embodiments, a wiper blade may include a wiper strip having a wide portion and a lip, and an elongate backing element having a top portion, and two opposing legs that descend from the top portion. Each opposing leg may have a claw which extends towards the other opposing leg, such that a gap between the claws may be narrower than a width of the wide portion of the wiper strip. The claws, legs, and top portion may define a wiper strip cavity sized to receive the wide portion wiper strip. A mounting base having a base section that may be secured on the top portion of the backing element. A cover having a top surface from which two opposing legs descend, and having two end walls that may join the top surface and legs of the cover at respective ends of the cover. Each opposing leg of the cover may include a bottom claw extending towards the other opposing leg of the cover. The cover may be disposed on and cover the backing element. The cover may have a central recess that encircles the mounting base.

In certain embodiments, a wiper blade may include a wiper strip having a top strip, an elongate backing element having a top portion, and two opposing legs that descend from the top portion. The backing element may also have a first rib portion and a second rib portion extending between the opposing legs along a bottom surface of the top portion; wherein the first rib portion comprises opposed legs descending from the first rib portion, each opposing leg of the rib portion having a claw that extends towards the other opposing leg of the rib portion, such that the opposing legs and claws of the rib portion secure the wiper strip such that the top strip of the wiper strip is held against the first rib portion.

BRIEF DESCRIPTION OF THE DRAWINGS

The drawings set forth exemplary embodiments of the disclosed concepts, and are not intended to be limiting in any way.

FIG. 1 illustrates a perspective view of an embodiment of a wiper blade.

FIG. 2 illustrates a perspective view of an exploded rendition of the components of the wiper blade shown in FIG. 1.

FIG. 8 illustrates a perspective view from above of a cover of the wiper blade shown in FIG. 1.

FIG. 9 illustrates a perspective view from below of a cover of the wiper blade shown in FIG. 1.

FIG. 10 illustrates a front view of a cover of the wiper blade shown in FIG. 1.

FIG. 11 illustrates a top view of a cover of the wiper blade shown in FIG. 1.

FIG. 12 illustrates a bottom view of a cover of the wiper blade shown in FIG. 1.

FIG. 13 illustrates a side view of a cover of the wiper blade shown in FIG. 1.

FIG. 14 illustrates a truncated perspective view of the end of a cover of the wiper blade shown in FIG. 1.

FIG. 15 illustrates a truncated perspective view of the end of a cover of the wiper blade shown in FIG. 1.

FIG. 16 illustrates a perspective view from above of the backing element of the wiper blade shown in FIG. 1.

FIG. 17 illustrates a perspective view from below of the backing element of the wiper blade shown in FIG. 1.

FIG. 38 illustrates a perspective view from above of the cover of the wiper blade shown in FIG. 36.

FIG. 39 illustrates a perspective view from below of the cover of the wiper blade shown in FIG. 36.

FIG. 40 illustrates a front view of the cover of the wiper blade shown in FIG. 36.

FIG. 41 illustrates a top view of the cover of the wiper blade shown in FIG. 36.

FIG. 42 illustrates a bottom view of the cover of the wiper blade shown in FIG. 36.

FIG. 48 illustrates a perspective view from above of the backing element of the wiper blade shown in FIG. 36.

FIG. 49 illustrates a perspective view from below of the backing element of the wiper blade shown in FIG. 36.

FIG. 50 illustrates a front view of the backing element of the wiper blade shown in FIG. 36.

FIG. 51 illustrates a top view of the backing element of the wiper blade shown in FIG. 36.

FIG. 52 illustrates a bottom view of the backing element of the wiper blade shown in FIG. 36.

DETAILED DESCRIPTION OF THE ILLUSTRATIVE EMBODIMENT

Figure 3:
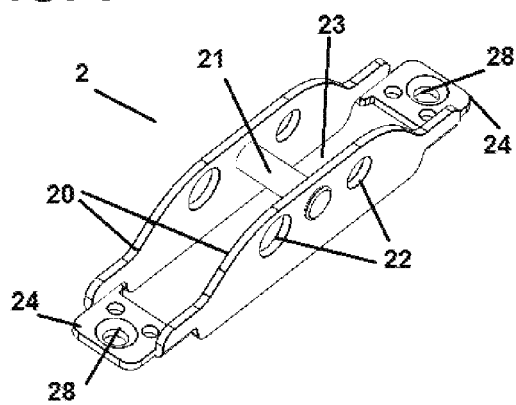
FIG. 3 illustrates a perspective view from above of the mounting base of the wiper blade shown in FIG. 1.
Figure 4:
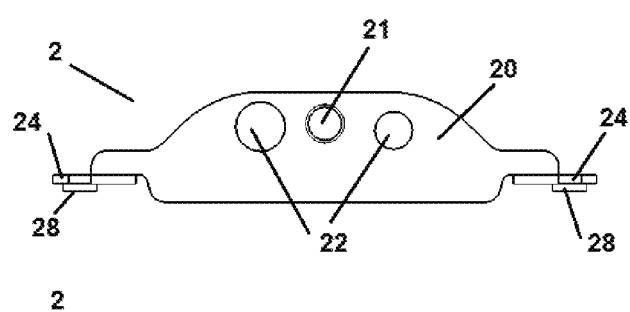
FIG. 4 illustrates a front view of the mounting base of the wiper blade shown in FIG. 1.
Figure 5:
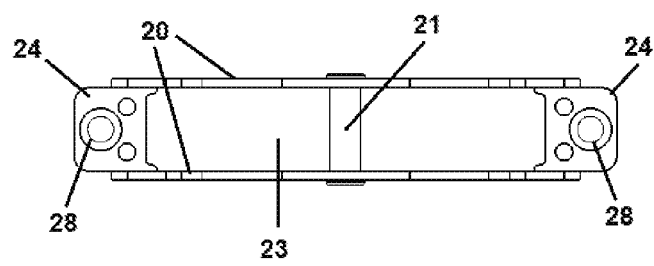
FIG. 5 illustrates a top view of the mounting base of the wiper blade shown in FIG. 1.
Figure 6:
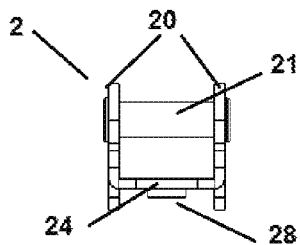
FIG. 6 illustrates a side view of the mounting base of the wiper blade shown in FIG. 1.
Figure 7:
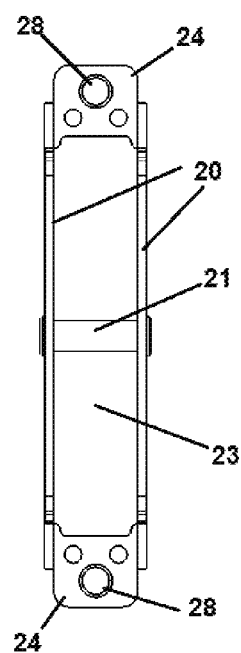
FIG. 7 illustrates a bottom view of the mounting base of the wiper blade shown in FIG. 1.
Figure 18:
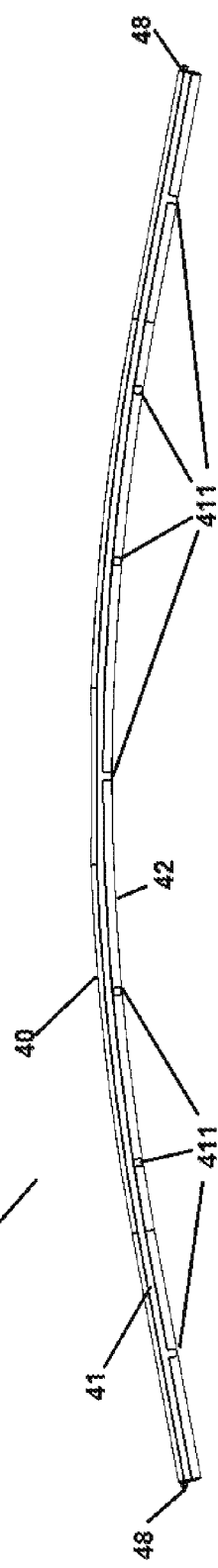
FIG. 18 illustrates a front view of the backing element of the wiper blade shown in FIG. 1.
Figure 19:
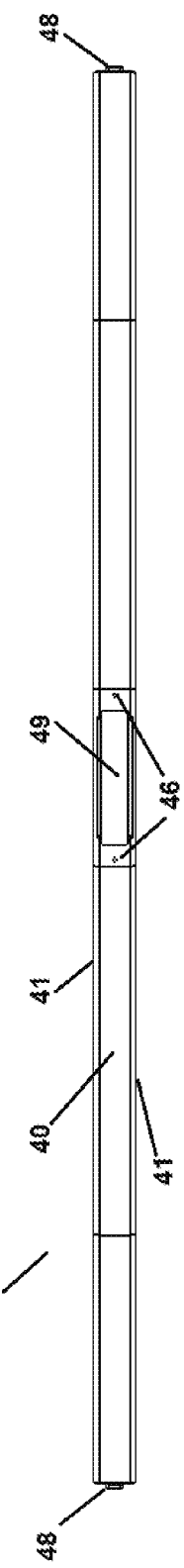
FIG. 19 illustrates a top view of the backing element of the wiper blade shown in FIG. 1.
Figure 20:
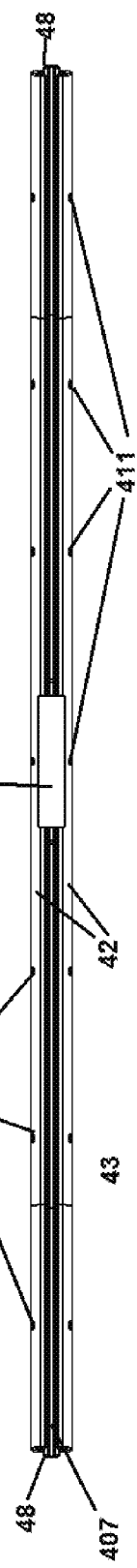
FIG. 20 illustrates a bottom view of the backing element of the wiper blade shown in FIG. 1.
Figure 21:
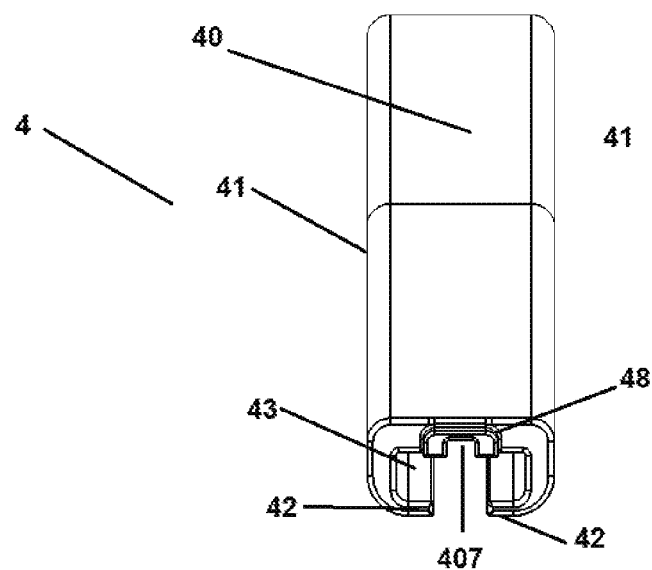
FIG. 21 illustrates a side view of the backing element of the wiper blade shown in FIG. 1.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments, a wiper blade may include an elongate wiper strip, an elongate backing element, a mounting base and a cover. The wiper strip may have a wiping lip, a wide portion, and an intermediate portion between the wiping lip and the wide portion such that the intermediate portion is narrower than the wide portion. The wiper blade may further include an elongate backing element having a top portion from which two opposing, elongate legs descend. Each leg may have an elongate claw that extends towards the opposite leg. The ends of the claws of the two legs may define a gap sized to receive the intermediate portion of the wiper strip. The mounting base may be capable of connecting the wiper blade to a wiper arm, and receiving a force from the wiper arm.

In certain embodiments, the backing element slideably engages the wiper strip directly, and the backing element may be pre-shaped and provide distribution of wiper arm force. In certain embodiments, the backing element may include claws along its length that slideably engage a wiper strip and one or more vertebrae. In certain other embodiments, a vertebra may be positioned between the backing element and the wiper strip. In certain embodiments, the backing strip and vertebra or vertebrae may work together to distribute the force from a wiper arm.

In certain embodiments, the backing element may slideably engage the wiper strip via a sleeve. The backing element may be elastic, and may have a section on which the mounting base is disposed, such that the mounting base is capable of applying a force from the wiper arm to the backing element, and the backing element is capable of distributing the force along the length of the wiper strip.

In certain embodiments, a cover may be provided that surrounds and covers the backing element.

In certain embodiments, a wiper blade may a wiper strip having a wide portion and a lip, and an elongate backing element. The backing element may have a top portion, and two opposing legs that descend from the top portion, such that each opposing leg has a claw which extends towards the other opposing leg. A gap may be formed between the claws that is narrower than a width of the wide portion of the wiper strip. The claws, legs, and top portion define a wiper strip cavity sized to receive the wide portion wiper strip.

In certain embodiments, the wiper blade may further have a wiper sleeve having a base from which two opposing legs descend, such that each leg of the wiper sleeve has a claw that extends towards the opposing leg of the wiper sleeve, such that the wiper sleeve base, legs and claws define a sleeve cavity that is sized to receive a top strip of the wiper strip. In certain embodiments, the sleeve may include a tongue on the top surface of its base, and the backing element may include an upper recess sized to receive the tongue.

In certain embodiments, the wiper strip may have an intermediate portion having a securing groove. The gap between the claws of the backing element may be sized to receive the intermediate portion the wiper strip by engaging the securing groove. In certain embodiments, the backing element may include at least one vertical projection extending downward from the legs. In certain such embodiments, the at least one vertical projection may extend even with, the bottom of the claws. In certain embodiments, the wiper blade may include a cover having at least one notch that engages the at least one vertical projection.

In certain embodiments, the wiper blade may include a cover having a top surface from which two opposing legs descend, and two end walls that join the top surface and legs of the cover at respective ends of the cover; wherein the cover is disposed on and covers the backing element. In certain embodiments, the backing element further may have a first end and a second end, each end having an end projection. The end walls of the cover further each may have a securing recess which receives one of the end projections of the backing element.

In certain embodiments, each opposing leg of the cover further comprises a bottom claw extending towards the opposing leg.

In certain embodiments, a mounting base having a base section may be secured on the top portion of the backing element. In certain embodiments, the backing element may have a central recess, such that the mounting base has a structure extending below the base portion and the central recess is sized and shaped to receive the structure. In certain embodiments, the mounting base may include two opposed vertical side walls extending above and below the base, wherein a rivet is disposed between the opposed vertical side walls, and wherein the structure comprises the portion of the vertical side walls extending below the base. In certain embodiments, a cover having a central recess that encircles the mounting base.

In certain embodiments, the base section of the mounting base may include at least one securing peg, and the top portion of the backing element comprises at least one securing hole, such that at least one securing hole receives and secures the at least one securing peg.

In certain embodiments, the wiper blade may include a cover having top surface that has a may have spoiler. In certain embodiments, the cover may have interior projections that engage complementary detents in the backing element. In certain embodiments, the interior projections are T-shaped.

In certain embodiments, a wiper blade may include a wiper strip having a wide portion and a lip, and an elongate backing element having a top portion, and two opposing legs that descend from the top portion. Each opposing leg may have a claw which extends towards the other opposing leg, such that a gap between the claws may be narrower than a width of the wide portion of the wiper strip. The claws, legs, and top portion may define a wiper strip cavity sized to receive the wide portion wiper strip. A mounting base having a base section that may be secured on the top portion of the backing element. A cover having a top surface from which two opposing legs descend, and having two end walls that may join the top surface and legs of the cover at respective ends of the cover. Each opposing leg of the cover may include a bottom claw extending towards the other opposing leg of the cover. The cover may be disposed on and cover the backing element. The cover may have a central recess that encircles the mounting base.

In certain embodiments, a wiper blade may include a wiper strip having a top strip, an elongate backing element having a top portion, and two opposing legs that descend from the top portion. The backing element may also have a first rib portion and a second rib portion extending between the opposing legs along a bottom surface of the top portion; wherein the first rib portion comprises opposed legs descending from the first rib portion, each opposing leg of the rib portion having a claw that extends towards the other opposing leg of the rib portion, such that the opposing legs and claws of the rib portion secure the wiper strip such that the top strip of the wiper strip is held against the first rib portion.

Figure 35:
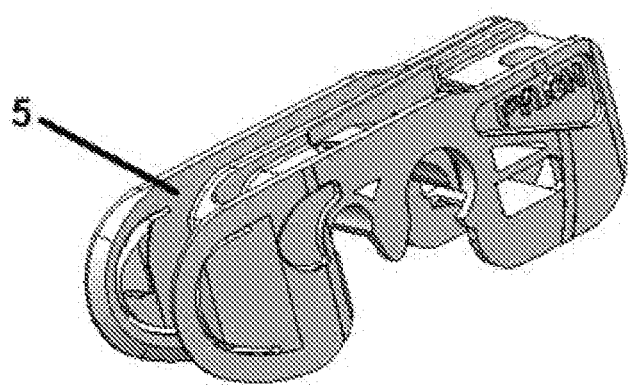
FIG. 35 illustrates an example connector that may be used with the wiper blade shown in Figure.

FIGS. 1-2 illustrate a wiper blade 1 which may have a mounting base 2, a cover 3, a backing element 4, vertebrae 6, and a wiper strip 7. The mounting base 2 may be configured to connect to a wiper arm through the use of a connector 5 or an adapter. One possible connector 5 which may be used in accordance with the disclosed concepts is depicted in FIG. 35. Such a connector is described in U.S. Pat. No. 6,680,340, which is incorporated herein by reference in its entirety. Any other suitable connectors or adapters known in the art may also be used with the disclosed concepts, including the connectors described in U.S. Pat. Nos. 8,806,700 and 9,108,595, and U.S. Publication Nos. 2013/0185889, 2013/0192015, 2014/0283325 and 2015/0251637, which are each incorporated herein by reference in their entireties. Persons of skill in the art will also recognize that the mounting base may be specifically adapted to connect to a particular type of wiper arm directly without the use of a connector or an adapter, including the mounting base designs disclosed in U.S. Publication No. 2014/0082875, which is incorporated herein by reference in its entirety. Similarly, persons of skill in the art will recognize that the cover depicted in FIGS. 1 and 2 is exemplary, and that any suitable cover, including covers with a spoiler as shown in FIGS. 36-47, may also be used in accordance with the disclosed concepts, including covers having spoilers with constant height and shape, covers having decreasing height, spoilers forming a centered isosceles triangle, or an off-center spoiler (as shown in FIG. 47), including covers as described in U.S. Patent Publication Nos. 2012/0266405 and 2013/0205532, which are incorporated herein by reference in their entirety. Additionally, persons of ordinary skill in the art will recognize that any suitable wiper strip known in the art may be used in accordance with the disclosed concepts, including the wiper strips described in U.S. Provisional Application Ser. No. 62/139,383, which is incorporated herein by reference in its entirety.

One exemplary mounting base 2 that may be use in accordance with the disclosed concepts is illustrated in FIGS. 2-7. The mounting base is preferably made of steel, though any other suitable material or combination of materials known in the art, including other metals, plastics, rubber, and resins, may also be used. Persons of skill in the art will recognize that any known mounting base may be used with the disclosed concepts, and such mounting bases may be implemented in many different ways, and different design choices may be made with respect to materials for all components, including the mounting base.

The mounting base 2 may have two or more cavity side walls 20 defining a cavity 23 therebetween. As Shown in FIG. 3, two of the sidewalls 20 may extend in the longitudinal direction of the wiper blade 1, and a rivet 21 may extend and be secured between same. The mounting base may further have one or more pin holes 22 to allow the pin of a pin-type wiper arm to pass through and be secured, by a connector 5 or otherwise. The mounting base may have a base section 24 between and joining the side walls 20. As also shown in those FIGS. 3-7 securing pegs 28 may be disposed on the base section 24. The securing pegs 28 may engage a securing hole 46 or recess in the backing element 4 or in the cover (not shown) via a snap fit, friction fit, or other form fitting connection. The top surface of the backing element 4 may also have a central opening 49, which receives any portions of the mounting base 2 which extend below the base sections 24. Persons of skill in the art will recognize that securing mechanism may be swapped, having the securing holes located in the mounting base 2, and the securing pegs located in the cover/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art.

FIGS. 8-15 illustrate an exemplary cover 3 in accordance with the disclosed concepts. The cover may be a single, unitary piece, as shown in FIGS. 8-13, or the cover may be made from separate cover sections which may connect to each other or to the mounting base 2. The cover 3 is preferably made of soft, elastic plastic or rubber, though any other suitable material or combination of materials known in the art, such as resins and silicon, for instance, may be used. In some embodiments the cover, or portions thereof may be made from a material having a Shore Hardness A of 70±5 or less. In other embodiments, the cover, or portions thereof may be made from a material having a Shore Hardness A of 60±5 or less. In other embodiments, the cover may be made from multiple materials, or having multiple hardnesses. It may be advantageous to have some portions of the cover, such as the claws made from a harder material, such as one having a Shore Hardness A of 85±5 or greater, or one having a Shore Hardness A of 95±5 or greater. For example, in one such embodiment, the hardness of the claws 32 may be greater than the hardness of the other parts of the cover 3. For example, the claws 32 may be made from hard plastic, while the other portions of the cover 3 may be made from a softer plastic or rubber. Persons of skill in the art will recognize that disclosed concepts may be implemented in many different ways, and different design choices may be made with respect to materials for all components, including the cover.

The cover 3 may include a top surface 30. As discussed above, any suitable cover known in the art may be used, with or without a spoiler. As shown in FIGS. 8-15, the cover 3 may have a top surface 30, from which two legs 31 may descend, and end walls 35 joining the top surface and legs of the cover at respective ends of the cover 3. The end wall may have a securing recess 351, which may receive and secure an end projection 48 on the backing element 4. Each leg may have a bottom claw 32 which may help to secure the backing element 4. In certain embodiments, as shown in FIGS. 8-15, the claws may have securing notches or recesses 321 formed along the length of the claws 32. These notches 321 may receive and secure vertical projections 411 on the backing element 4 via a snap fit, friction fit, or other form fitting connection. Persons of skill in the art will recognize that securing mechanism may be swapped, having the notches located in the backing element 2, and the projections located in the cover. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art. The cover 3 may further have a central opening 39 which may encircle and/or secure the mounting base 2.

FIGS. 16-24 illustrate an exemplary backing element 4 in accordance with the disclosed concepts. The backing element 4 is preferably made of hard or resilient, sprint-elastic plastic, though any other suitable material or combination of materials known in the art, including metals, rubber, and resins, for example, may be used. In some embodiments the backing element 4, or portions thereof may be made from a material having a Shore Hardness A of 85±5 or greater. In some embodiments the backing element 4, or portions thereof may be made from a material having a Shore Hardness A of 95±5 or greater. In other embodiments, the backing element 4 may be made from multiple materials, or having multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 5, alone or with the help of the vertebrae distribute the force received from the wiper arm along the length of the wiper strip 7.

Figure 22:
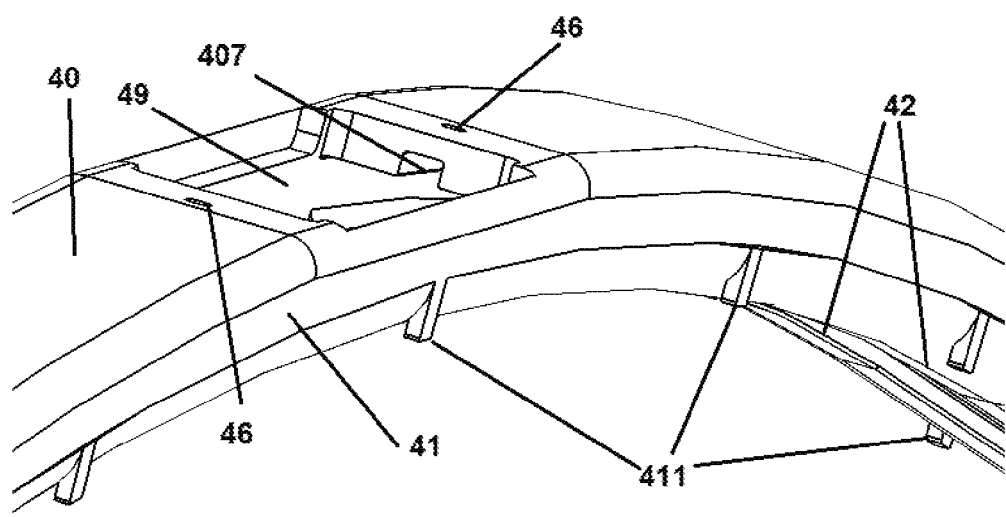
FIG. 22 illustrates a perspective view of the front center portion of the wiper blade shown in FIG. 1.
Figure 23:
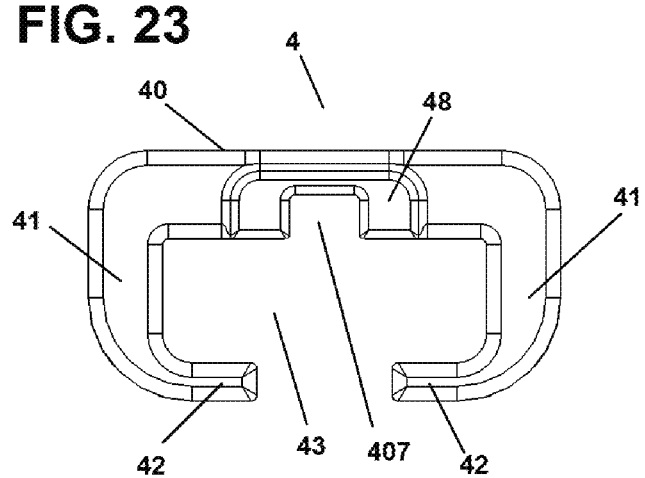
FIG. 23 illustrates a side view of an end of the backing element of the wiper blade shown in FIG. 1.
Figure 24:
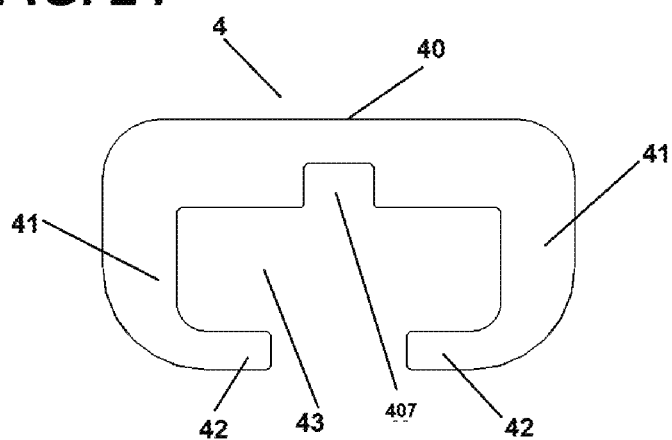
FIG. 24 illustrates a cross-sectional profile of the backing element of the wiper blade shown in FIG. 1.
Figure 25:
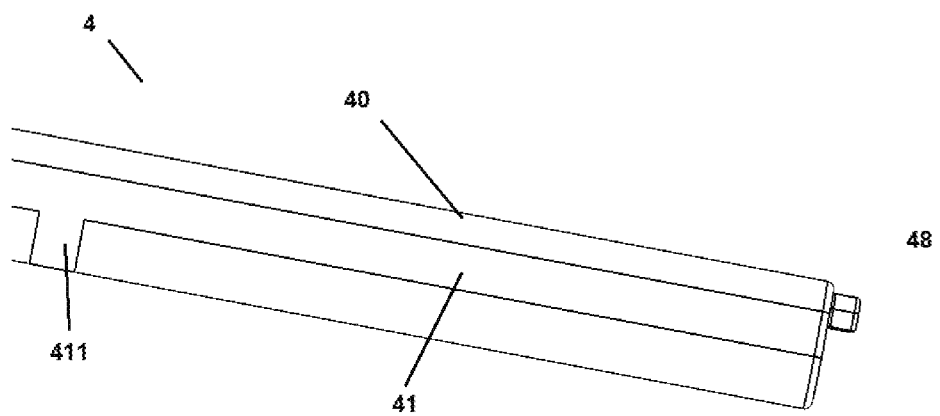
FIG. 25 illustrates a side view of the end portion of the backing element of the wiper blade shown in FIG. 1

The elongate backing element 4 may have a top portion 40, from which two opposing legs 41 descend. Each opposing leg may have a claw 42 which extends towards the opposing leg. The claws 42, legs 41, and top portion 40 may define a wiper strip cavity 43 sized to receive the wide portion 75 of a wiper strip 7 and/or a wiper sleeve 47. Similarly, the opposing claws 42 may define a gap therebetween sized to receive the intermediate portion 73 of a wiper strip 7—which may be narrower than the wide portion 75 of the wiper strip 7—by engaging a recess or securing groove 76 (these terms may be used interchangeably) adjacent to the intermediate portion 73. The backing element 4 may also have vertical projections 411 extending from the legs 41. As shown in FIGS. 22 and 25, these vertical projections 411 may project downwards from the legs, to extend even with, or just past, the bottom of the claws 42. As discussed above, these vertical projections 411 may engage the notches or recesses 321 in the cover 3, and may be secured by same. [87] The top portion 40 of the backing element 4 may also have an upper recess 407. The upper recess 47 may be sized to receive and secure a tongue 477 from a wiper strip sleeve 47. As discussed above, the backing element 4 may have a central opening 49 to receive portions of the mounting base which extend below the base section 24, and securing holes 46 to receive and engage securing pegs 28 in the mounting base 2. As also discussed above, the backing element 4 may also have other securing structures, including pegs, projections, detents, recesses, holes, shoulders, and any other suitable structure known in the art in order to engage and secure a complementary structure in the mounting base 2 or cover 3.

As shown in FIGS. 17, 21, 24 and 25, the ends of the backing element 4 may be provided with end projections 48 which engage end securing recess 351 in the end walls 35 of the cover. Persons of skill in the art will recognize that the securing structures may be swapped, such that the end wall 35 of the cover 3 have securing projections received by end recesses in the ends of the backing element 4, and that any other suitable securing mechanism known in the art may be used, including detents and recesses, dovetails, opposed projections, and other such structures may be used.

Figure 26:
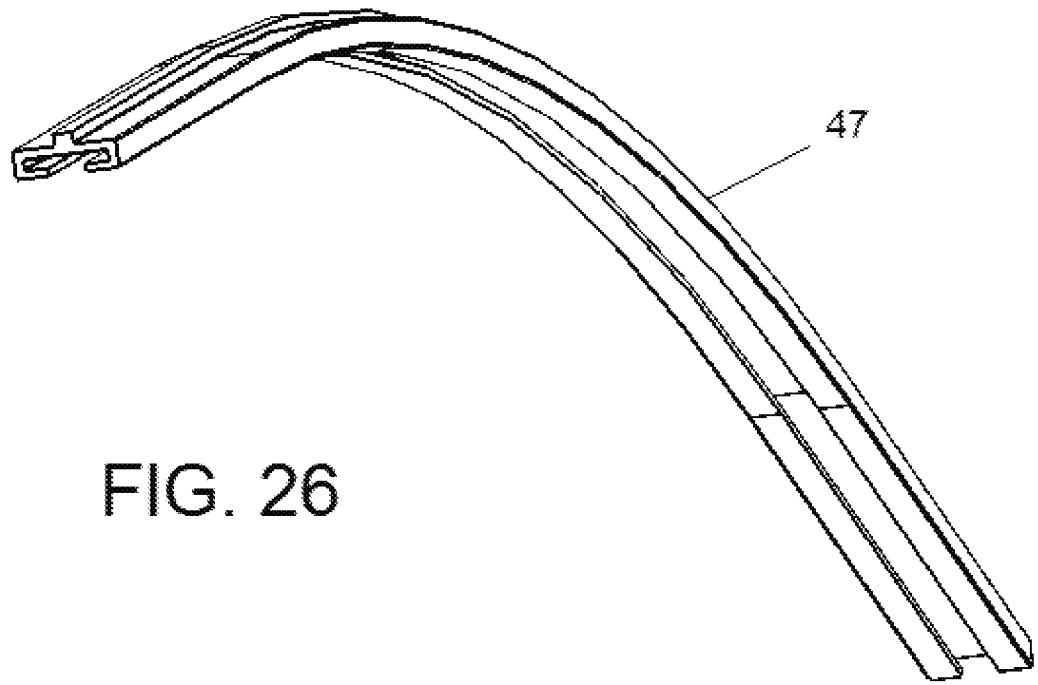
FIG. 26 illustrates a perspective view of the wiper strip sleeve of the wiper blade shown in FIG. 1.
Figure 27:
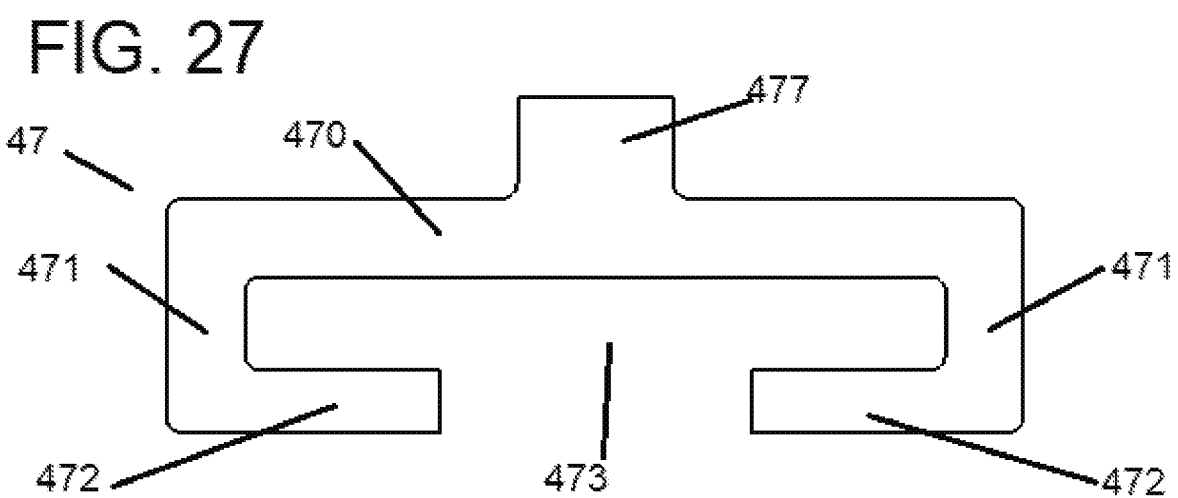
FIG. 27 illustrates a cross-sectional profile of the wiper strip sleeve of the wiper blade shown in FIG. 1.

FIGS. 26 and 27 illustrate an exemplary embodiment of a wiper strip sleeve 47. The wiper strip sleeve 47 comprises a base 470 from which two opposing legs 471 may descend. Each leg 471 may further have a claw 472 extending inwardly perpendicular to the leg 471. The sleeve cavity 473 may be sized to receive a top strip 70 of a top portion 75 of a wiper strip 7. Further, the claws 472 extending inwardly towards each opposing leg 471 may engage a groove 74 of a wiper strip 7 such that the top strip 70 is seated within the sleeve cavity 473. Also, the lower claws 42 of the backing element 4 may each engage a securing groove 76 in the wiper strip 7. Further, in some embodiments, the opposing lower claws 42 may define a gap therebetween sized to receive the intermediate portion of 73 of a wiper strip 7, and may secure the intermediate portion 73 by engaging a recess or securing groove 76 (these terms may be used interchangeably) adjacent to the intermediate portion 73. In some embodiments, the base 470 of the wiper strip sleeve 47 may have a tongue 477 that may be sized to engage the upper recess 407 of the backing element 4.

Figure 28:
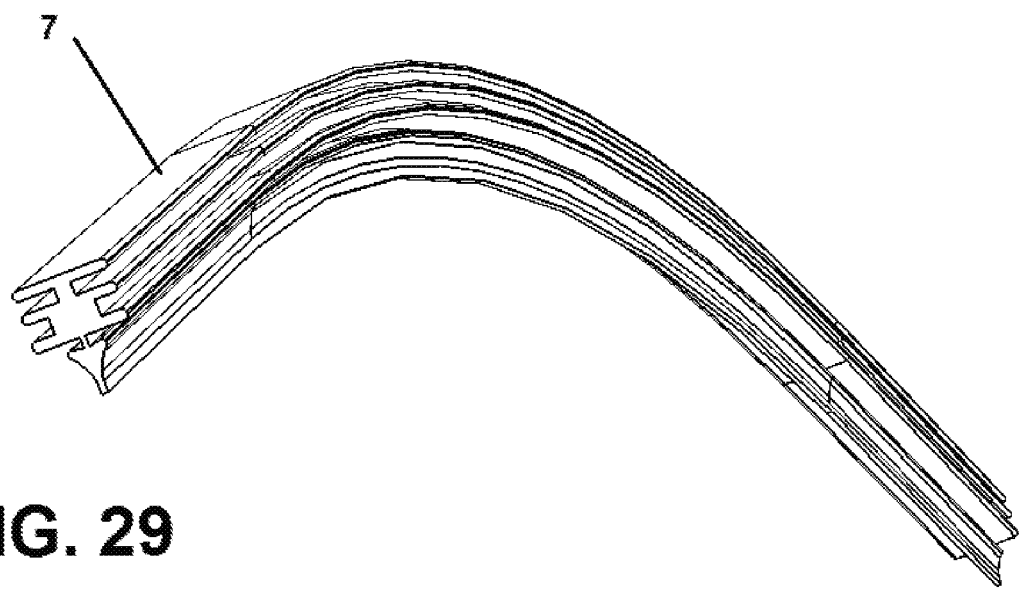
FIG. 28 illustrates a perspective view of the wiper strip of the wiper blade shown in FIG. 1.
Figure 29:
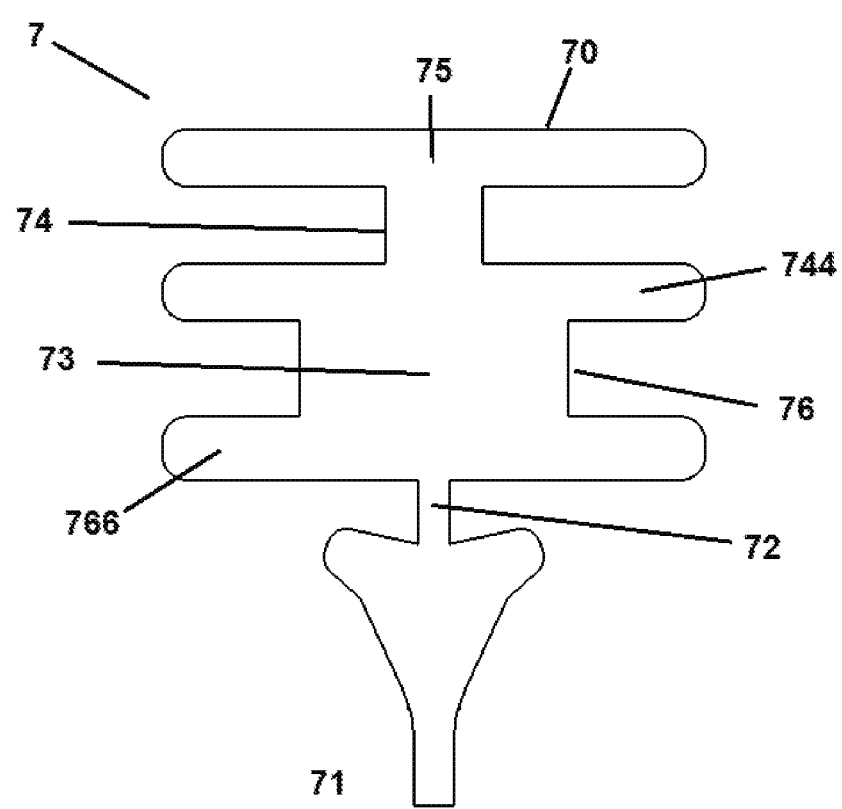
FIG. 29 illustrates a cross-sectional profile of the wiper strip of the wiper blade shown in FIG. 1.

FIGS. 28 and 29 illustrate an exemplary wiper strip 7 that may be used in accordance with the disclosed concepts. The wiper strip is preferably made of a soft rubber or plastic, but may be made of any suitable material. The wiper strip may have a top portion 75 having a top strip 70 from which an intermediate portion 73 descends. The top portion 75 may have one or more grooves 74 which may house the claws 472 of a wiper strip sleeve 47, or may alternatively house vertebrae or flexors 6 (these terms may be used interchangeably). The intermediate portion may be sized to fit between the claws 42 of the backing element 4, and may have a recessed portion or securing groove 76 which is sized to receive the claws 42. In some embodiments, as shown in FIG. 28, the groove 74 above the intermediate portion 73 and below the top strip 70, may be formed between the top strip 70 and intermediate arms 744 of a wiper strip 7. Similarly, the securing groove 76 of the wiper strip 7 may be formed adjacent the intermediate portion 73 between the intermediate arms 744 and the bottom arms 766 of a wiper strip. Persons of skill in the art will recognize that any suitable wiper strip may be used in accordance with the disclosed concepts.

Figure 30:
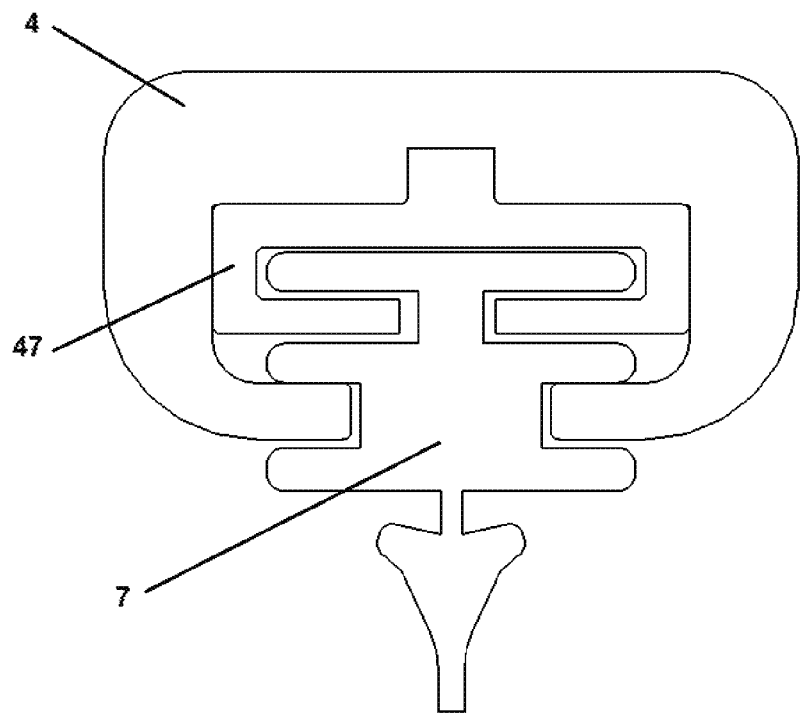
FIG. 30 illustrates a cross-sectional view of the backing element, wiper strip sleeve and wiper strip of the wiper blade shown in FIG. 1.
Figure 31:
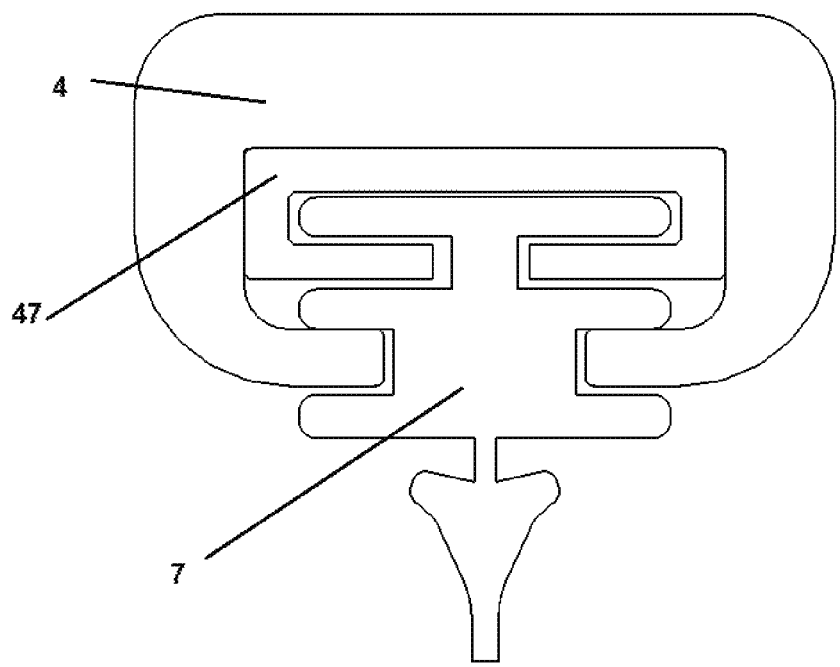
FIG. 31 illustrates a cross-sectional view of the backing element, wiper strip sleeve and wiper strip of an alternative embodiment.

FIG. 30 illustrates the combined wiper strip 7, wiper strip sleeve 47, and backing element 4, secured to one another as described above. However, persons of ordinary skill in the art will recognize that alternative methods of securing these elements to one another are possible. For example, FIG. 31 illustrates an alternative embodiment of the disclosed concepts wherein the wiper strip sleeve 47 does not feature a tongue 477, and the top portion 40 of the backing element 4 does not feature an upper recess 407.

Figure 32:
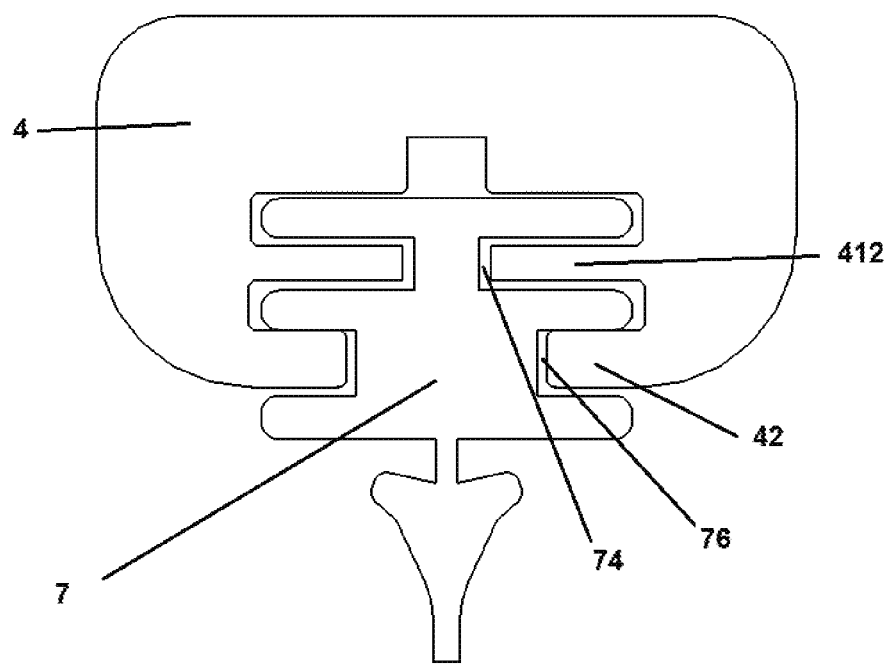
FIG. 32 illustrates a cross-sectional view of the backing element and wiper strip of an alternative embodiment.

Similarly, FIG. 32 illustrates an alternative embodiment of the disclosed concepts' backing element 4 that secures a wiper strip 7 directly without using a wiper strip sleeve. As shown in FIG. 32, backing element 4 may include an inner rail 412 which may engage the groove 74 of the wiper strip, while the claws 42 engage the securing groove 76 of the wiper strip 7.

Figure 33:
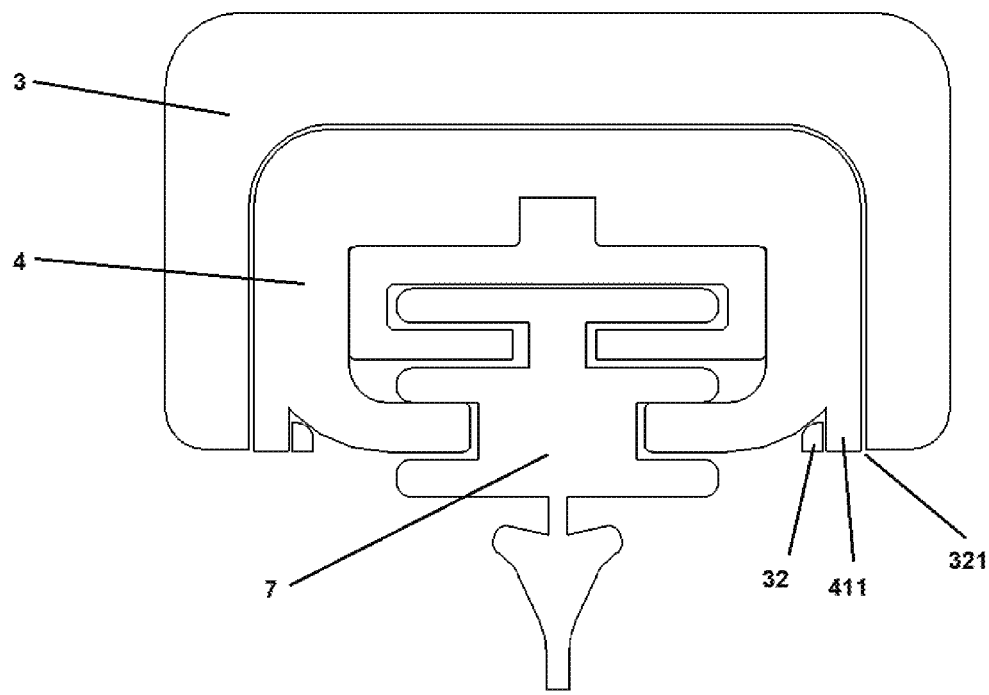
FIG. 33 illustrates a cross-sectional view of the cover, backing element, wiper strip sleeve and wiper strip of the wiper blade shown in FIG. 1.

Similarly, persons of ordinary skill in the art will recognize that the cover 3 may be secured to the backing element 4 in any suitable manner known in the art. FIG. 33 illustrates the manner in which the vertical projections 411 on the backing element 4 engage the notches 321 on the claws 32 of the cover 3 in order to secure the cover 3 to the backing element 4.

Figure 34:
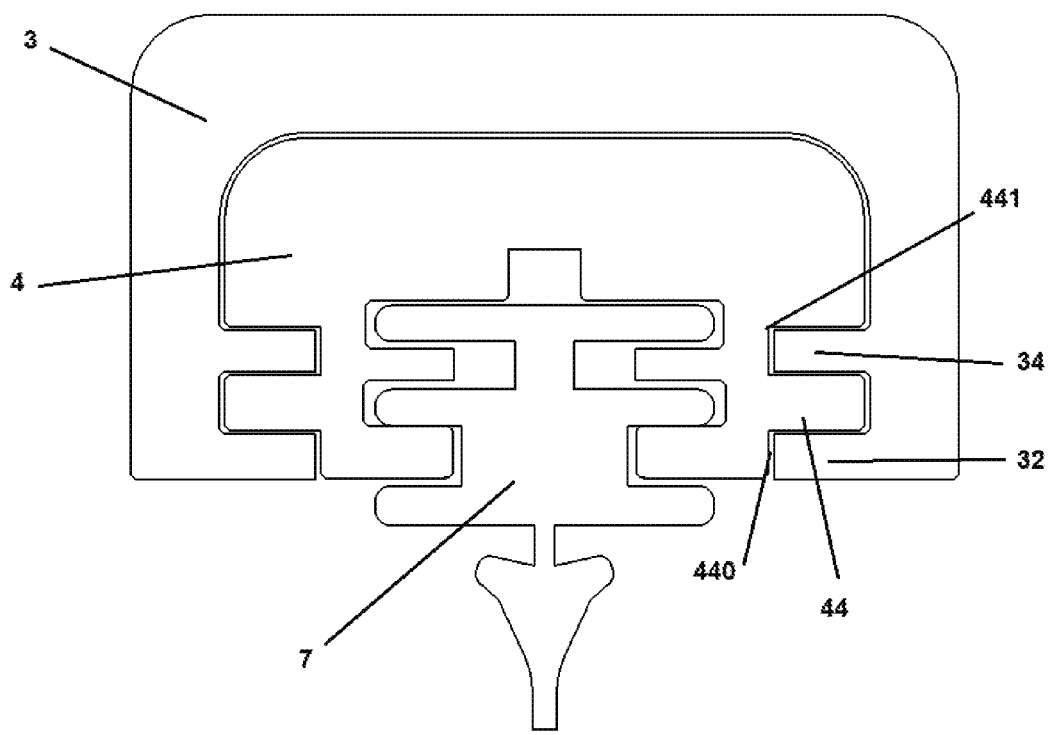
FIG. 34 illustrates a cross-sectional view of a cover, backing element and wiper strip of an alternative embodiment.

FIG. 34 illustrates an alternative manner in which the cover 3 can be secured to the backing element 4. In this embodiment, the cover 3 is provided with both a bottom claw 32 and a top claw 34. Similarly, the backing element 4 is provided with an outer rail 44, which defines a lower recess 440 and a channel cavity 441. In this manner the top claw 34 of the cover engages and secures the channel cavity 441 of the backing element 4, and the bottom claw 32 of the backing element 4 engages and secures the bottom recess 440 of the backing element. Persons of skill in the art will further recognize that the cover 3 may optionally have other backing element securing structures, such as pegs, detents, shoulders, projections, recesses, holes, and other such structures known in the art, along the bottom surface 38, the legs 31, the claws 32, 34, or the groove formed therebetween, such that these securing structures engage corresponding complementary securing structures in the backing element 4, such as holes, shoulders, detents, recesses, projections, pegs and other such structures known in the art, or that these structures can be reversed between the backing element 4 and the cover 3.

As discussed above, FIG. 35 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

Figures 36, 37:
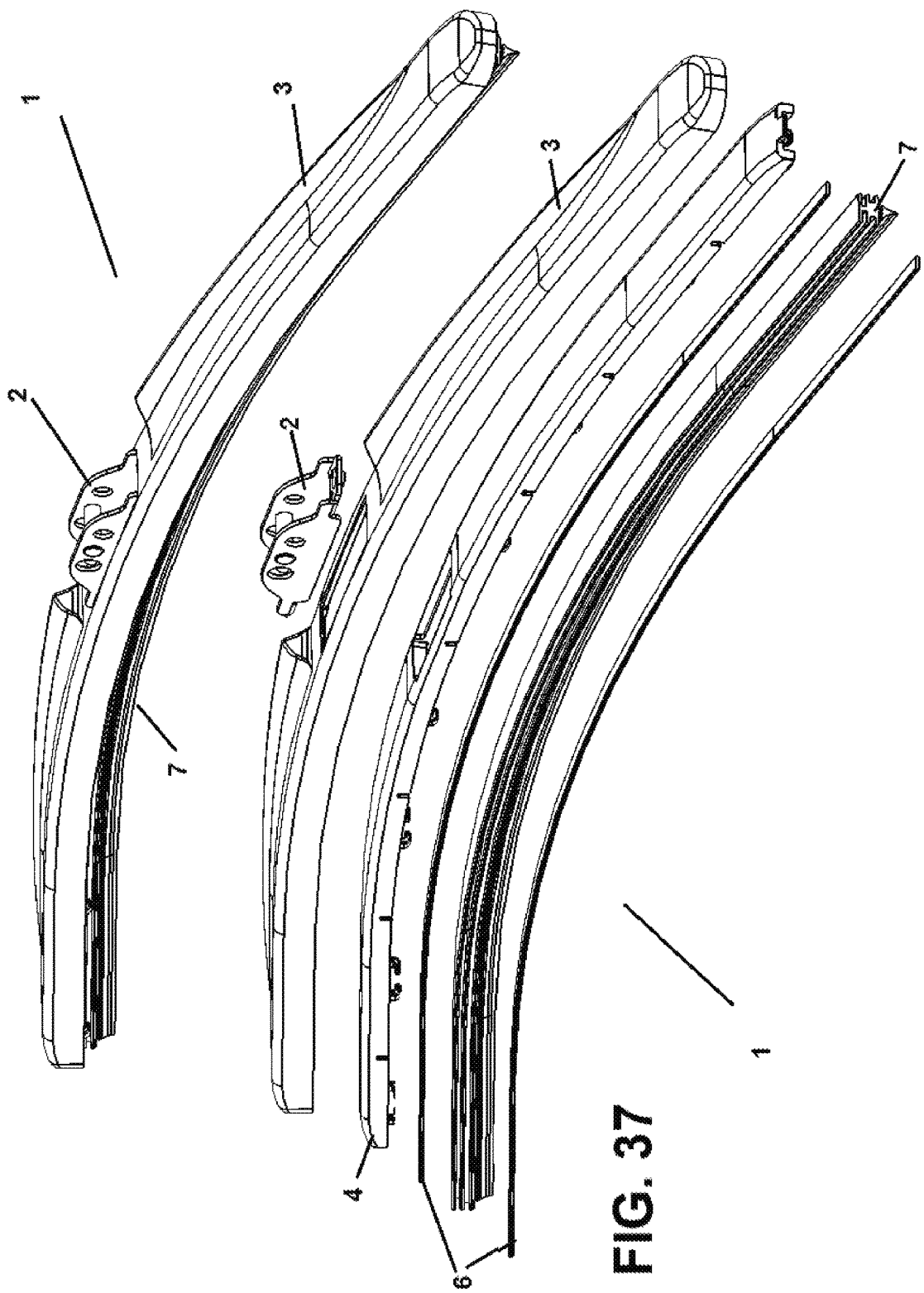
FIG. 36 illustrates a perspective view of an embodiment of a wiper blade.
FIG. 37 illustrates a perspective view of an exploded rendition of the components of the wiper blade shown in FIG. 36.
Figure 43:
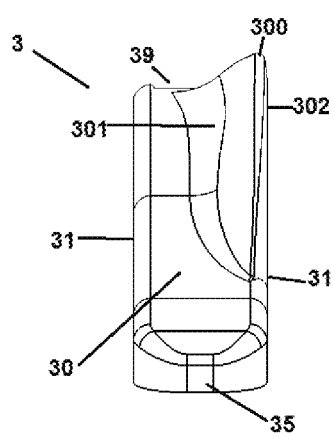
FIG. 43 illustrates a side view of the cover of the wiper blade shown in FIG. 36.
Figure 44:
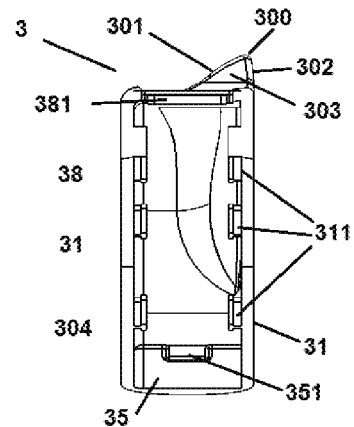
FIG. 44 illustrates a cross-sectioned side view of the cover of the wiper blade shown in FIG. 36.

FIGS. 36-37 illustrate an alternative embodiment of the disclosed concept having a mounting base 2, a cover 3 having a spoiler, a backing element 4, a wiper strip 7, and vertebrae 6. As with the embodiment illustrated in FIGS. 1-2, any suitable mounting base, including the mounting base depicted in FIGS. 2-7 may be used in accordance with the disclosed concepts.

Figure 45:
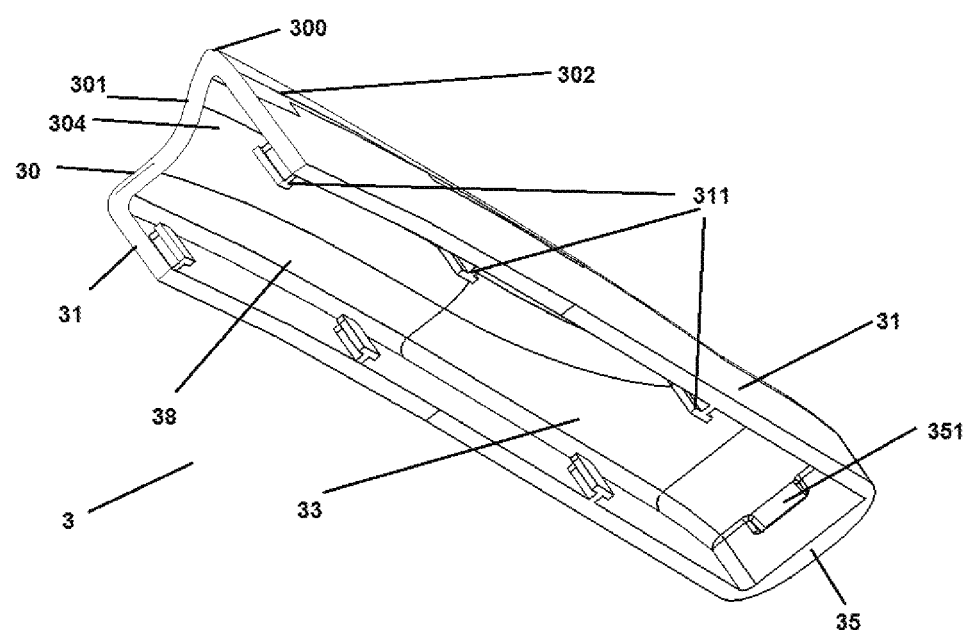
FIG. 45 illustrates a cross-sectioned perspective view of an end of the cover of the wiper blade shown in FIG. 36.
Figure 46:
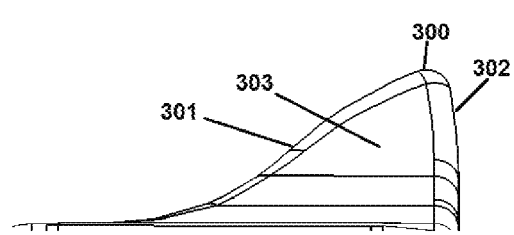
FIG. 46 illustrates the spoiler profile of the cover of the wiper blade shown in FIG. 36.
Figure 47:
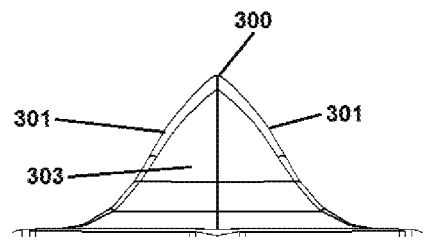
FIG. 47 illustrates an embodiment of a spoiler profile of a cover.
Figure 53:
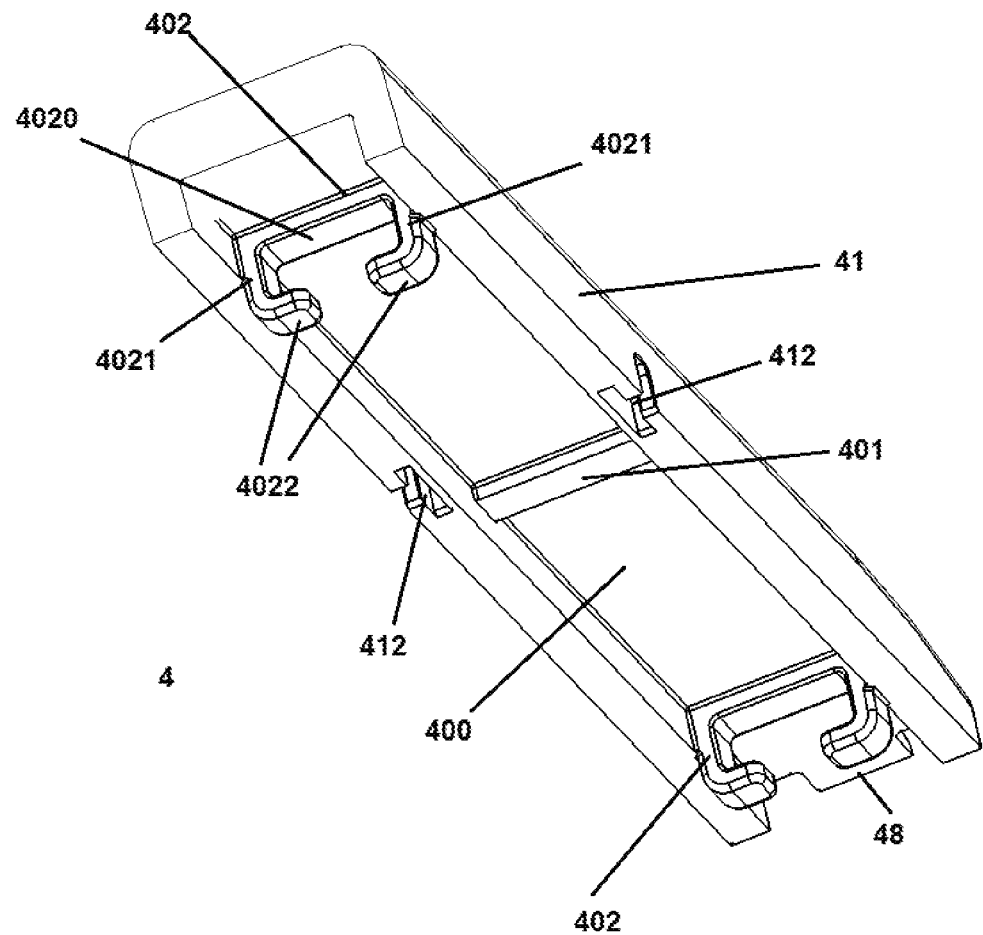
FIG. 53 illustrates a truncated perspective view from below of the end of the backing element of the wiper blade shown in FIG. 36.

FIGS. 38-46 illustrate the cover 3 of the embodiment shown in FIGS. 36-37. As shown in these figures, the top surface 30 of the cover 3 may form a spoiler having an apex 300, an attack surface 301, and a back surface 302. As shown in FIG. 46, the attack surface 302 may be concave. The cover may further have at least one leg 31, where the back surface 302 may blend into, or be in line with the leg 31. Thus the bottom portion of the back surface 302 may also be considered a leg 31. As discussed above, the apex 300 may be alternatively centered FIG. 47, and the back surface may also be provided with an attack surface 301 such that the spoiler forms an isosceles triangle (with or without concave attack surface sides) such that the front of the wiper blade 1 functions the same as the back of the wiper blade 1. As illustrated in FIG. 41, the apex 300 may end before the end of cover 3 and merge into the top surface 30 of the cover 3. A wall 303 may join the attack surface 301 and the back surface 302 near the center of the cover 3. An end wall 35 may be provided used to join the ends of the top surface 30 (including the spoiler 300, 301, 302) and the leg(s) 31.

The top surface 30 may have a central opening 39, which may encircle and secure the mounting base 2. The spoiler 300, 301, 302 may be split into two spoiler sections on either side of the opening such that a gap 305 separates the spoiler sections and allows the mounting base to be disposed therein. Alternatively, as discussed above, the cover may be a one piece of unitary construction (as shown in FIGS. 36-46), or may comprise cover sections that join to each other, or are secured to the mounting base.

As shown in FIGS. 37, 39, and 42 the end wall 35 may encapsulate and surround the wiper strip 7 and backing element 4. The end wall may further have a securing recess 351 which may receive an end projection 48 from the backing element 4.

The cover further has a bottom surface 38, which may be provided with mounting base recesses 381 to accommodate the base sections 24 of the mounting base 2. The bottom surface may have a spoiler cavity 304 formed by the surfaces opposite the attack surface 301 and the back surface 302. The spoiler cavity may serve to minimize the weight of the cover, the materials needed to construct same, and the impact of the cover on the distribution of force from a wiper arm. The bottom surface 38, together with the legs 31 and the end walls may define a backing element cavity 33, to receive the backing element 4. Each leg 31 may be provided with one or more interior projections 311 which engage and secure complementary detents 412 in the backing element. As shown in FIG. 45, the interior projections may be T-shaped, or may have any other suitable shaped that can be secured to a complementary structure in the backing element. Persons of ordinary skill in the art will recognize that the structure of interior projections 311 and the complementary detents 412 can be swapped between the cover 3 and backing element 4, and that any other suitable structure known in the art, including without limitation, projections, recesses detents, dove tails, etc., may be used to secure these structures to each other.

FIGS. 46-53 illustrate an exemplary backing element 4 in accordance with the disclosed concepts. The backing element 4 is preferably made of hard, sprint-elastic plastic, though any other suitable material or combination of materials known in the art, including metals, rubber, and resins, for example, may be used. In some embodiments the backing element 4, or portions thereof may be made from a material having a Shore Hardness A of 85±5 or greater. In some embodiments the backing element 4, or portions thereof may be made from a material having a Shore Hardness A of 95±5 or greater. In other embodiments, the backing element 4 may be made from multiple materials, or having multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 4 is pre-shaped and, alone or with the help of the vertebrae 6, distributes the force received from the wiper arm along the length of the wiper strip 7.

The elongate backing element 4 may have a top portion 40, from which two opposing legs 41 descend. As discussed above, the backing element 4 may have a central opening 49 to receive portions of the mounting base which extend below the base section 24, and securing holes 46 to receive and engage securing pegs 28 in the mounting base 2. As also discussed above, the backing element may also have other securing structures, including pegs, projections, detents, recesses, holes, shoulders, and any other suitable structure known in the art in order to engage and secure a complementary structure in the mounting base 2 or cover sections 3.

The legs 41 of the backing element 4 may have complementary detents 412, which receive and secure inner projections 311 on the legs 31 of the cover 3. As discussed above, other suitable structures for securing a cover to the backing element known in the art may also be used in accordance with the disclosed concepts.

The backing element 4 may also have a bottom surface 400 having one or more ribs 401 extending between the opposing legs 41 to add additional structural support.

Figure 55:
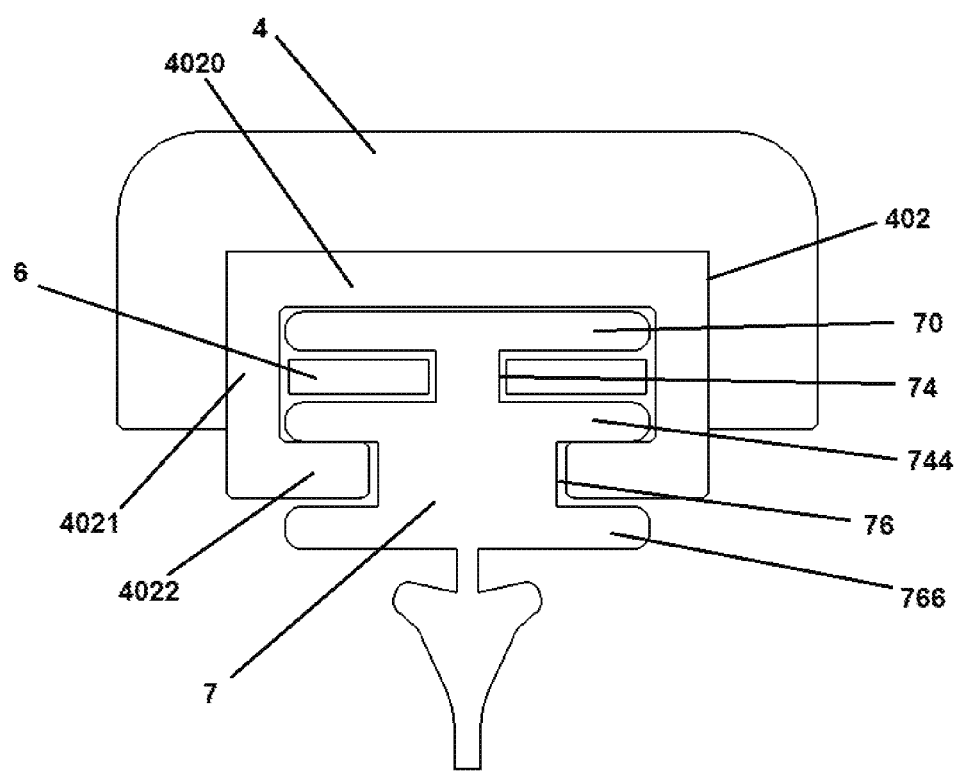
FIG. 55 illustrates a cross-sectional profile of the backing element, wiper strip and vertebrae of the wiper blade shown in FIG. 36.

Wiper strip clips 402 may also extend downwardly from the bottom surface 400 of the backing element 4, and secure the wiper strip to the backing element. Each wiper strip clip 402 may consist of a rib portion 4020 from which two legs 4021 descend, such that each leg 4021 may be provided with a claw 4022 oriented towards the opposite leg. As shown in FIG. 55, the legs 4021 of the wiper strip clip 402 may be sized to secure a wiper strip such that the top strip 70 is held against the rib portion 4020 of the wiper strip clip 402, and the legs extend past the top portion 75 groove 74 and intermediate arms 744 of the wiper strip 7 and position the claws 4021 within the securing groove 76 of the wiper strip 7. Vertebrae may be disposed within the grooves 74, such that the wiper strip clips 402 secure both the wiper strip 7 and the vertebrae 6 within the backing element 4.

As discussed above, FIG. 35 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

Figure 54:
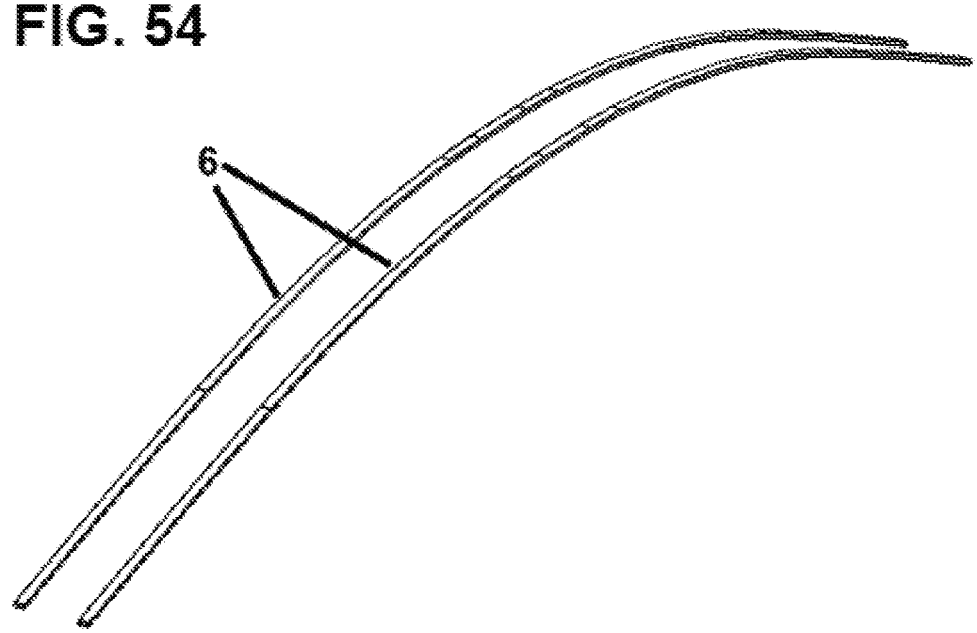
FIG. 54 illustrates the vertebrae of the backing element of the wiper blade shown in FIG. 36.

FIG. 54 illustrates vertebrae in accordance with the disclosed concepts. The vertebrae are preferably made out of metal, such as steel, though may be made from any suitable material. The vertebrae may be made from a spring-elastic material, including spring-elastic metal. Accordingly, the vertebrae 6 may with the backing element 4 distribute the force received from a wiper arm along the length of the wiper strip 7. Vertebrae 6 may also be disposed within grooves 74 in the top portion 75 of the wiper strip 7 and add lateral support to the wiper strip 7.

A type of plastic which can be used to make the backing element, and other structures of the disclosed wiper blades is glass-filled PPO (Modified PolyPhenyleneOxide). Other materials with similar physical properties are ABS, Acetal—Delrin, PET and PBT (Polyester) and Nylon. Glass-filled PPO has excellent thermal and electrical properties, an excellent and fire retardant rating (UL 94 V-1 @ 0.058" thick), extremely low water/moisture absorption, very low thermal expansion, and is vacuum formable, machinable and bondable. It has good temperature resistance and is readily available in sheet or rod form. Glass-filled PPO has excellent machining capabilities, and can be used with tight tolerances, and is dimensionally stable at high continuous temperature (185 degrees F.; 265 degrees F.). However, as discussed above, any suitable material known in the art may be used in accordance with the disclosed concepts.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

Accordingly, the foregoing descriptions are intended as illustrative, and not as limiting.

I claim:

1. A wiper blade comprising:
a wiper strip having a top portion and a lip; and
an elongate backing element having a top portion and two opposing legs that descend from the top portion;
a wiper clip descending from the top portion between the two opposing legs of the elongate backing element, the wiper clip including a rib portion and two opposing rib legs descending from the rib portion, each rib leg including a rib claw extending towards the opposing rib leg, the rib legs and rib claws dimensioned to secure the wiper strip;
a mounting base having a base section that is secured on the top portion of the backing element; and
a cover having a central recess that encircles the mounting base.

2. The wiper blade of claim 1, wherein the top portion of the wiper strip includes laterally projecting intermediate arms and laterally projecting lower arms positioned between the intermediate arms and the lip, a space between each intermediate and lower arm defined as a securing groove and each rib claw is securable within the securing groove.

3. The wiper blade of claim 2, wherein the top portion of the wiper strip includes a pair of laterally adjacent grooves proximate the intermediate arms distanced from the securing groove.

4. The wiper blade of claim 3 further comprising a pair of elongate vertebrae, each vertebrae positioned in one of the pair of grooves.

5. The wiper blade of claim 1 wherein the backing element has a central recess, wherein the mounting base has a structure extending below the base section wherein the central recess is sized and shaped to the structure.

6. The wiper blade of claim 1 wherein the base section of the mounting base further comprises at least one securing peg, and the top portion of the backing element comprises at least one securing hole, such that at least one securing hole receives and secures the at least one securing peg.

7. The wiper blade of claim 1 wherein the cover has a top surface comprising a spoiler.

8. The wiper blade of claim 1 wherein the cover has interior projections that engage complementary detents in the backing element.

9. The wiper blade of claim 8 wherein the interior projections are T-shaped.

* * * * *